(12) United States Patent
Anscomb et al.

(10) Patent No.: US 11,769,166 B1
(45) Date of Patent: *Sep. 26, 2023

(54) SYSTEMS AND METHODS OF GENERATING NEW ONLINE USER ACCOUNTS AND REWARDING ONLINE ACCOUNT USERS FOR GENERATION OF NEW ONLINE USER ACCOUNTS

(71) Applicants: Brian C. Anscomb, New York, NY (US); Earle R. Anscomb, Astalula, FL (US)

(72) Inventors: Brian C. Anscomb, New York, NY (US); Earle R. Anscomb, Astalula, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/894,643

(22) Filed: Aug. 24, 2022

Related U.S. Application Data

(63) Continuation of application No. 17/730,681, filed on Apr. 27, 2022, now Pat. No. 11,468,461.

(51) Int. Cl.
*G06Q 30/0207* (2023.01)
*G06K 7/14* (2006.01)
*G06K 19/06* (2006.01)

(52) U.S. Cl.
CPC ....... *G06Q 30/0207* (2013.01); *G06K 7/1417* (2013.01); *G06K 19/06037* (2013.01)

(58) Field of Classification Search
CPC ............ G06Q 30/0207; G06K 7/1417; G06K 19/06037
See application file for complete search history.

(56) References Cited

U.S. PATENT DOCUMENTS

| | | | |
|---|---|---|---|
| 11,468,461 B1* | 10/2022 | Anscomb | G06Q 30/0207 |
| 2013/0215004 A1* | 8/2013 | Nordlinder | G06K 19/06056 427/58 |
| 2019/0197377 A1* | 6/2019 | Studnicka | G06K 19/06056 |
| 2020/0092272 A1 | 3/2020 | Eisen et al. | |

\* cited by examiner

*Primary Examiner* — Matthew Mikels
(74) *Attorney, Agent, or Firm* — Norris McLaughlin, P.A.

(57) ABSTRACT

Systems and methods display machine-readable codes and assembled machine-readable codes that drive or push new online users to generate new online user accounts and reward new and/or existing online account users for generating new online user accounts.

20 Claims, 26 Drawing Sheets

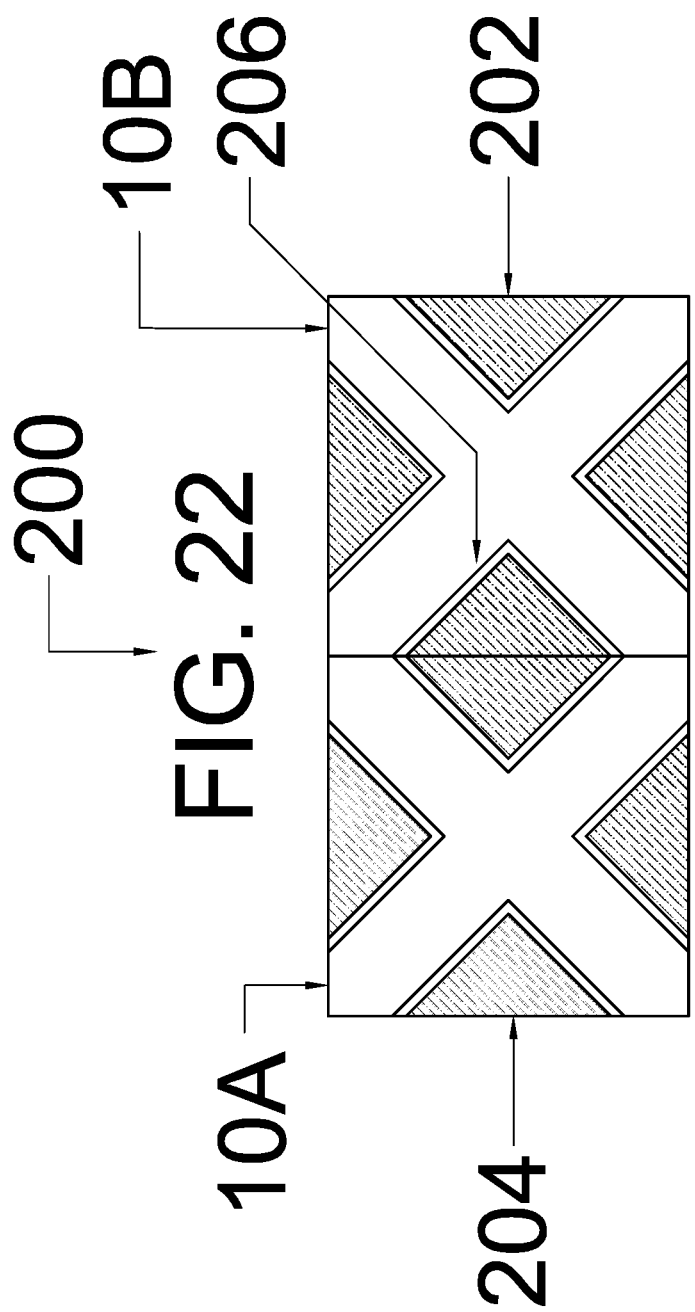

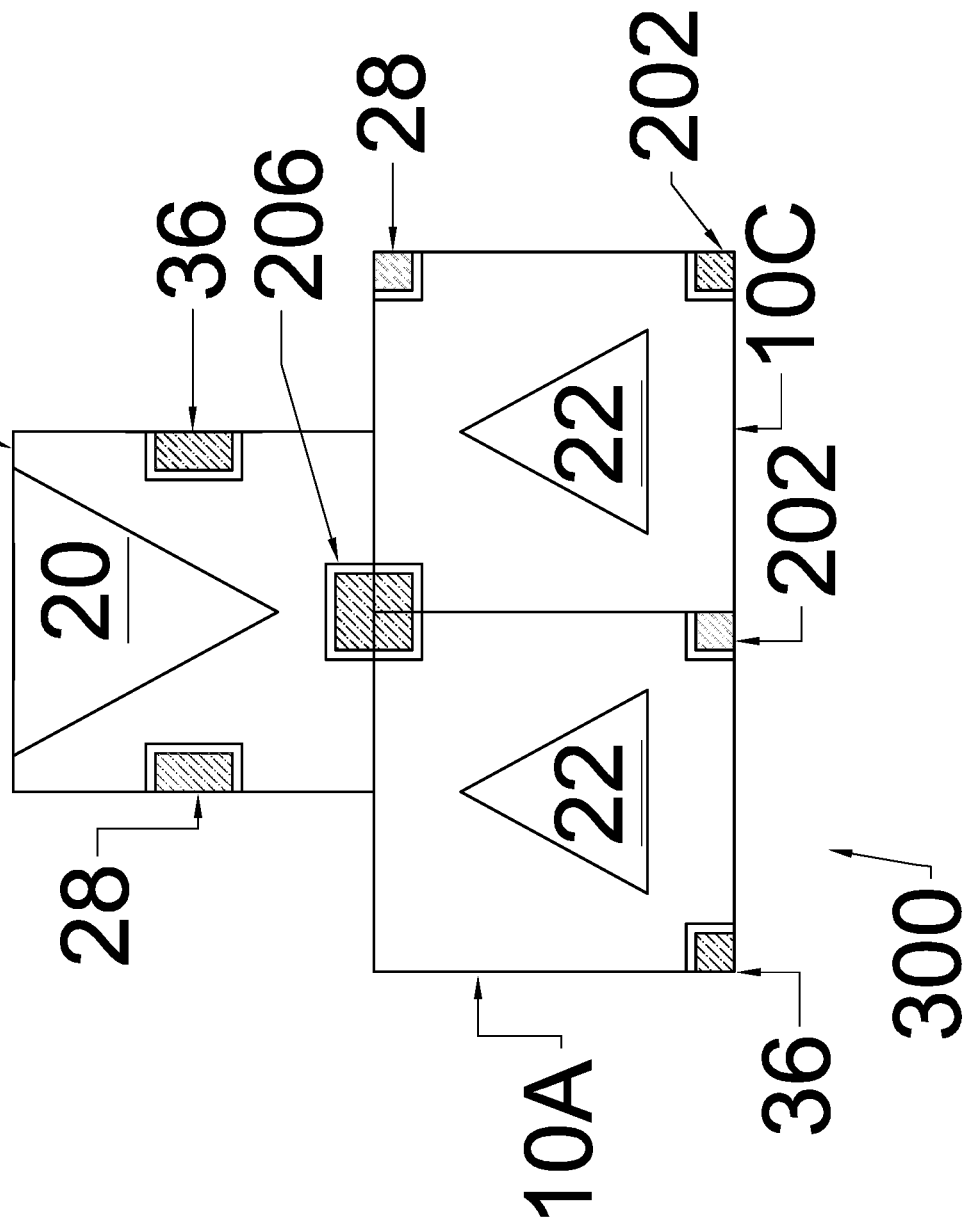

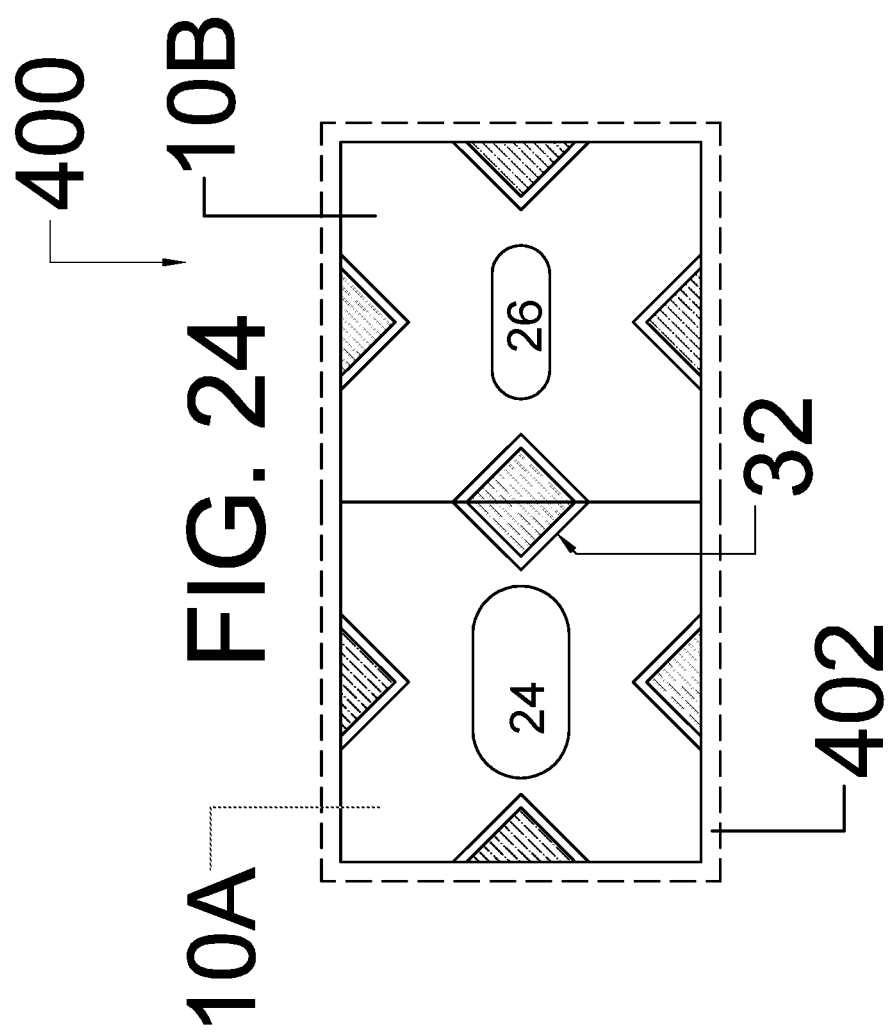

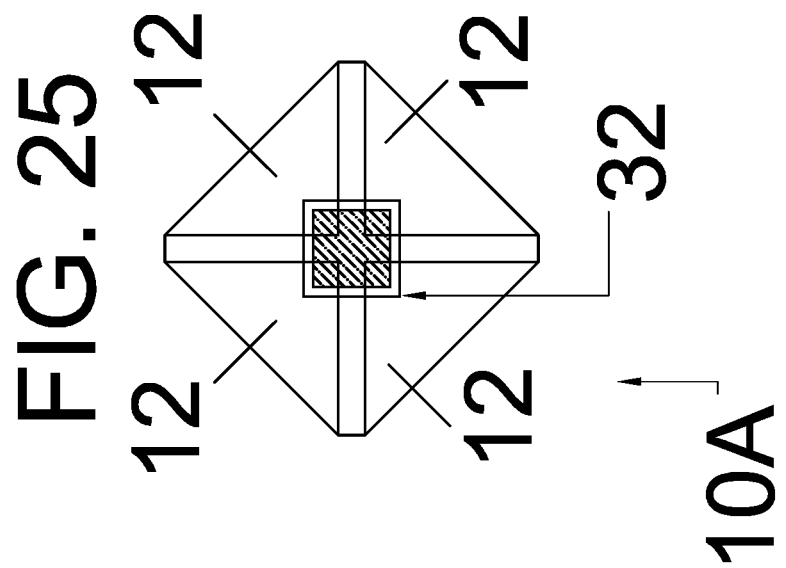

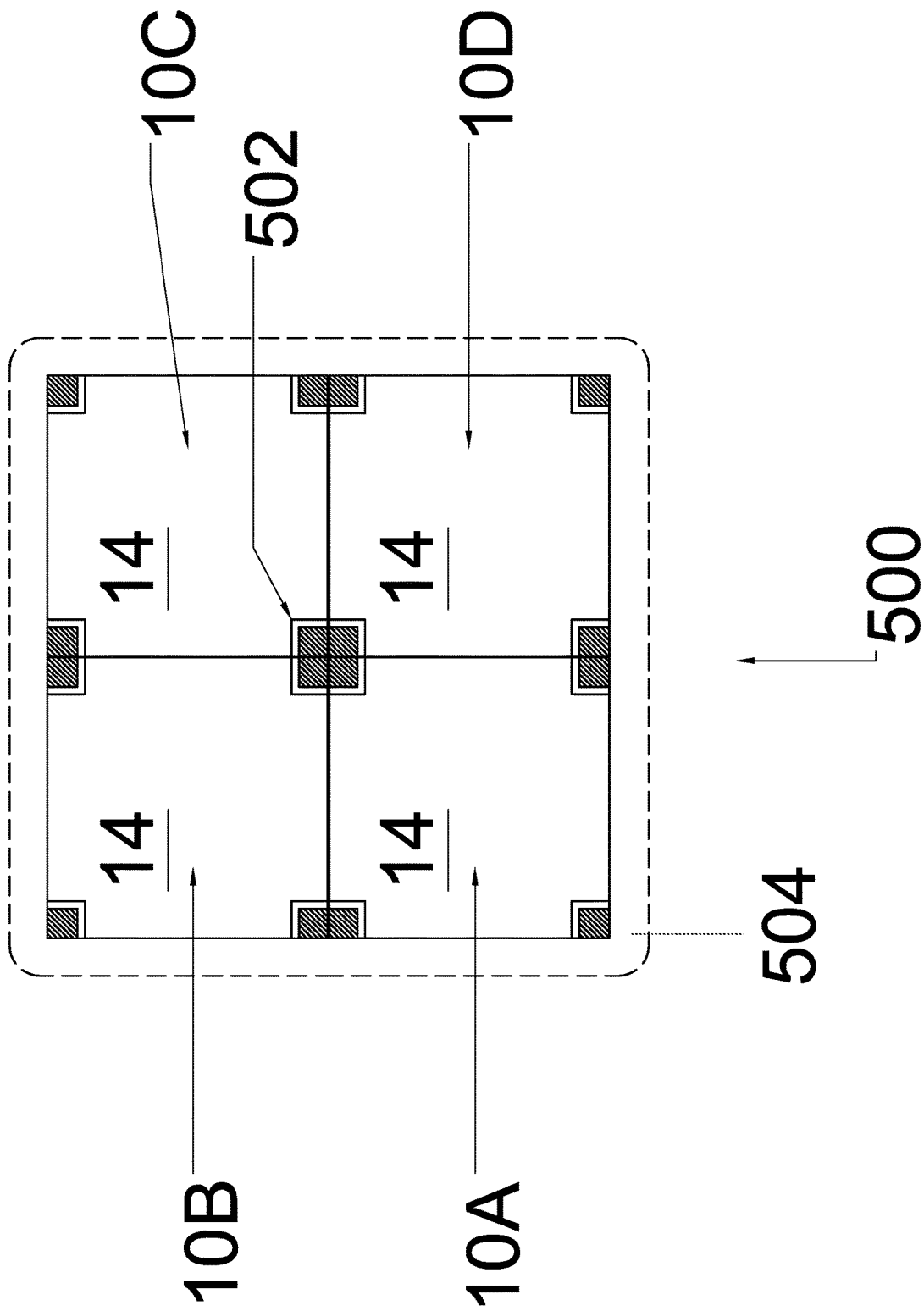

US 11,769,166 B1

SYSTEMS AND METHODS OF GENERATING NEW ONLINE USER ACCOUNTS AND REWARDING ONLINE ACCOUNT USERS FOR GENERATION OF NEW ONLINE USER ACCOUNTS

This application is continuation of U.S. patent application Ser. No. 17/730,681, filed Apr. 27, 2022, the disclosure of which patent application is incorporated herein by reference.

FIELD OF THE DISCLOSURE

The present systems and methods disclosed herein display machine-readable labels configured for generating new online account users and rewarding online account users new online user account generations. The machine-readable labels displayed on the present systems and methods may drive or direct one or more new users to one or more online websites/webpages adapted for opening or creating new online accounts and/or one or more existing users to the one or more online websites/webpages adapted for logging into, accessing, or opening existing online accounts. After generating, opening, or creating the new online accounts or opening, logging into, or accessing the existing online accounts, the machine-readable labels displayed on the present systems and/or assembled via the present methods disclosed herein may provide or transfer at least one gift, reward, promotional discount, promotional award, and/or payment to the new online account users and/or the existing online account users. The at least one gift, reward, promotional discount, promotional award, payment, or combination thereof transferred or assigned to the new or existing online account users may be facilitated by assembled machine-readable labels displayed on the present systems and/or assembled via the present methods disclosed herein. The assembled machine-readable labels displayed on the present systems and/or assembled via the present methods may be scannable by at least one of at least one portable digital device, at least one optical scanner, and/or at least one handheld mobile device of the new and/or existing online account users. As a result of scanning or reading the assembled machine-readable labels, the digital device, optical scanner, and/or mobile device may be direct to the one or more online or internet-accessible websites/webpages and the at least one gift, reward, promotional discount, promotional award, and/or payment to the new and/or existing online account users may be transferred or assigned to the new and/or existing online account users via the one or more online or internet-accessible websites/webpages. As a result, the present systems and methods disclosed herein facilitate the generation of the new online account users and the rewarding of the newly generated online account users or existing online account users with the at least one gift, reward, promotional discount, promotional award, payment, or combination thereof.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one or more embodiments, systems configured to generate new online user accounts are disclosed herein, wherein the systems may comprise at least one machine-readable code disposed on a first planar card surface and selected from a first machine-readable matrix or two-dimensional barcode indicative of at least one new online user account website or webpage provided by an online provider or a second machine-readable matrix or two-dimensional barcode indicative of at least one existing online user account website or webpage provided by the online provider. Further, the systems may comprise at least one first partial machine-readable code disposed on a second planar card surface. Still further, the systems may comprise at least one second partial machine-readable code contacting or abutting a flat or straight assembly card edge. Moreover, the at least one first partial machine-readable code may be alignable with the at least one second partial machine-readable code or assemble edges of the first and second partial machine-readable codes may abut or contact each other. As a result, the at least one first partial machine-readable code may be alignable and/or combinable with the at least one second partial machine-readable code to assemble, form, produce, or provide at least one first assembled machine-readable matrix or two-dimensional barcode indicative of at least one first online account reward website or webpage.

In an embodiment, each machine-readable matrix or two-dimensional barcode of the first machine-readable matrix or two-dimensional barcode, the second machine-readable matrix or two-dimensional barcode, and the at least one first assembled machine-readable matrix or two-dimensional barcode may be a machine-readable quick response code.

In an embodiment, the systems may further comprise a card having a first planar side, a second planar side opposite with respect to the first planar side, and a perimeter defined by an outer edge or edges of the card and comprising the flat or straight assembly card edge, wherein at least one selected from the first planar side and the second planar side comprises the first planar card surface or the second planar card surface.

In an embodiment, the systems may further comprise a first card comprising the at least one first partial machine-readable code and at least one second card comprising the at least one second partial machine-readable code, wherein the at least one first assembled machine-readable matrix or two-dimensional barcode is displayable and machine-readable when an assembly edge of the first card abuts or contacts an assembly edge of the at least one second card.

In an embodiment, the systems may further comprise at least one third partial machine-readable code disposed on a third planar card surface, wherein the at least one third partial machine-readable code is alignable with the at least one partial code selected from the first partial machine-readable code and the second partial machine-readable code such that the at least one third partial machine-readable code is combinable with the at least one first partial machine-readable code or the at least one second partial machine-readable code to form or produce at least one second assembled machine-readable matrix or two-dimensional barcode indicative of at least one second online account reward website or webpage.

In an embodiment, the systems may further comprise a first card comprising the at least one first partial machine-readable code and at least one second card comprising the at least one second partial machine-readable code, wherein at least one card selected from the first card and the at least one second card comprises the third planar card surface.

In an embodiment, the at least one second card may comprise a third card having the third planar card surface disposed thereon.

In an embodiment, the at least one second assembled machine-readable matrix or two-dimensional barcode may comprise a third assembled machine-readable matrix or two-dimensional barcode indicative of at least one third online account reward website or webpage.

In an embodiment, the systems may further comprise at least one fourth partial machine-readable code disposed on a fourth planar card surface, wherein the at least one fourth partial machine-readable code is alignable with the at least one partial code selected from the first partial machine-readable code, the second partial machine-readable code, and the third partial machine-readable code such that the at least one fourth partial machine-readable code is combinable with the at least one first partial machine-readable code, the at least one second partial machine-readable code, or the third partial machine-readable code to form or produce at least one third assembled machine-readable matrix or two-dimensional barcode indicative of at least one third online account reward website or webpage.

In an embodiment, the least one second card may comprise the at least one partial code selected from the at least one second partial machine-readable code, the at least one third partial machine-readable code, and the at least one fourth partial machine-readable code, and the at least one third assembled machine-readable matrix or two-dimension barcode is displayable and machine-readable when an assembly edge of the first card abuts or contacts an assembly edge of the at least one second card.

In an embodiment, the systems may further comprise at least one online account reward accessible via the at least one first online account reward website or webpage, wherein the at least one online account reward has a monetary value and/or a transactional value with respect to an online user account associated with the online provider.

In an embodiment, the systems may further comprise at least one first online account reward accessible via the at least one first online account reward website or webpage, wherein the at least one first online account reward has a first monetary value and/or a first transactional value with respect to a first online user account associated with the online provider. The system may also further comprise at least one second online account reward accessible via the at least one second online account reward website or webpage, wherein the at least one second online account reward has a second monetary value and/or a second transactional value with respect to a second online user account associated with the online provider, wherein the first monetary value and/or the first transactional value is less than or greater than the second monetary value and/or the second transactional value.

In one or more embodiments, methods of generating new online user accounts and rewarding online account users facilitated by the systems disclosed herein are provided, wherein the methods may comprise image scanning or machine-reading the first machine-readable matrix or two-dimensional barcode, creating a new online user account associated with the online provider via the at least one new online user account website or webpage, and aligning the at least one first partial machine-readable code and the at least one second partial machine-readable code to produce at least one first assembled machine-readable matrix or two-dimensional barcode. The methods may also comprise image scanning or machine-reading the at least one first assembled machine-readable matrix or two-dimensional barcode and accessing and/or opening a first online account reward website or webpage associated based on the at least one first assembled machine-readable matrix or two-dimensional barcode.

In an embodiment, the methods may further comprise receiving or accessing at least one first online account reward via the accessed and/or opened first online account reward website or webpage, wherein the at least one first online account reward has a first monetary value and/or a first transactional value with respect to a first online user account associated with the online provider.

In an embodiment, the methods may further comprise image scanning or machine-reading the second machine-readable matrix or two-dimensional barcode, accessing an existing online user account associated with the online provider via the at least one existing online user account website or webpage, aligning the at least one first partial machine-readable code and at least one third partial machine-readable code to produce at least one second assembled machine-readable matrix or two-dimensional barcode, image scanning or machine-reading the at least one second assembled machine-readable matrix or two-dimensional barcode, and accessing and/or opening a second online account reward website or webpage based on the at least one second assembled machine-readable matrix or two-dimensional barcode.

In an embodiment, the methods may further comprise receiving, accessing, or assigning at least one second online account reward via the accessed and/or opened second online account reward website or webpage, wherein the at least one second online account reward has a second monetary value and/or a second transactional value with respect to a second online user account associated with the online provider.

In an embodiment, the first monetary value and/or the first transactional value of the at least one second online reward may be less than, greater than, or about equal to the second monetary value and/or the second transactional value of the at least one first online reward.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In at least one embodiment, one structural feature or more of the various features set forth in the drawings submitted herewith may be drawn to scale or at least substantially to scale. In other embodiments, the one or more structural features shown herein are not drawn to scale but are scalable to one or more skilled artisans.

FIG. 22 is a bottom plan view of two display systems or items as shown in FIG. 21 abutting each other such that an assembled first machine-readable label or an assembled second machine-readable label is displayed thereon, wherein the assembled first or assembled second machine-readable label is one of the sixteen assembled machine-readable labels that may be displayed thereon by the two display systems or items, according to one or more examples of the disclosure.

FIG. 23 is a bottom plan view of three display systems or items abutting each other such that an assembled first machine-readable label or an assembled second machine-readable label is displayed thereon, wherein the assembled first or assembled second machine-readable label is one of nine assembled machine-readable labels that may be displayed thereon by the two display systems or items, according to one or more examples of the disclosure.

FIG. 24 is a top plan view of a tray/holder configured to align abutting display systems or items that are displaying printed indicia and an assembled first machine-readable label or an assembled second machine-readable label thereon, according to one or more examples of the disclosure.

FIG. 25 is a bottom plan view display system or item folded onto itself to display an assembled first machine-readable label or an assembled second machine-readable label, wherein each of the four corners of display system or item have been folded inward to assemble the assembled first or assembled second machine-readable label, according to one or more examples of the disclosure.

FIG. 26 is top plan view of a tray/holder configured to align a plurality of abutting display systems or items that are displaying an assembled first machine-readable label or an assembled second machine-readable label thereon, according to one or more examples of the disclosure.

DETAILED DESCRIPTION

Figure 1:
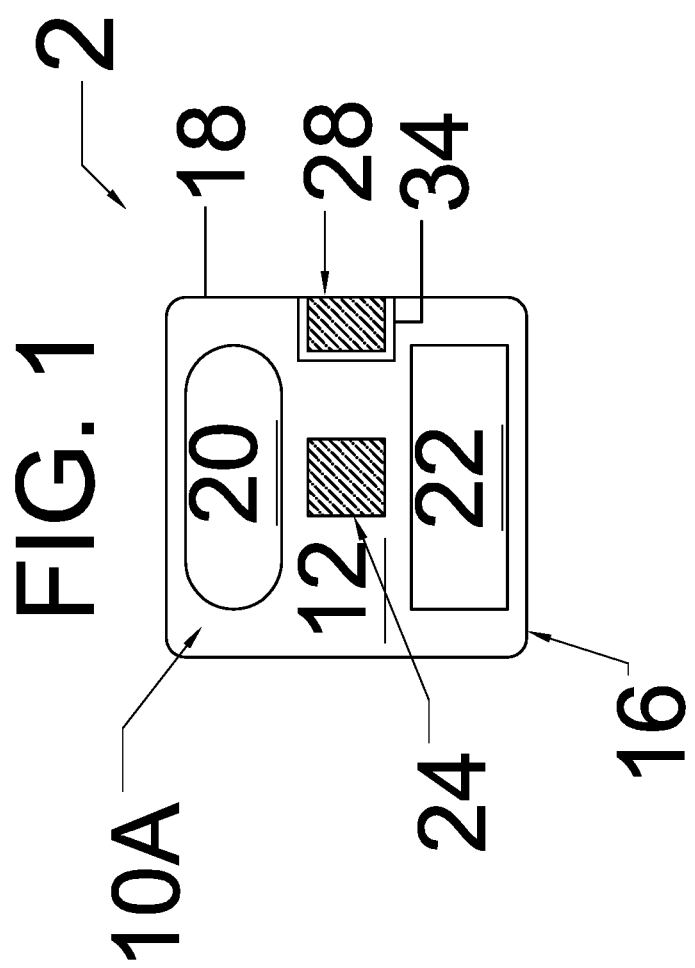
FIG. 1 is a top plan view of a display system or item comprising at least a first machine-readable label and at least one portion of an assembled machine-readable label, according to one or more examples of the disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

As used herein, the phrases "selected from the group consisting of," "chosen from," and the like include mixtures of the specified materials. Tunis such as "contains" and the like are meant to include "including at least" unless otherwise specifically noted. Where a numerical limit or range is stated, the endpoints are included. Also, all values and subranges within a numerical limit or range are specifically included as if explicitly written out.

As shown in FIGS. 1-6, the first system 2 disclosed herein may comprise a first pad, card, item, and/or mat (hereinafter "the pad 10A"). The pad 10A has a first side 12, a second side 14 opposite with respect to the first side 12, and a perimeter 16 defined by an outer edge or edges of the pad 10A. In some embodiments, the pad 10A may be a planar item or pad, wherein the first side 12 has a planar or flat surface and/or the second side 14 has a planar or flat surface. The pad 10A make comprise an assembly edge 18 along one or more portions of the perimeter 16 of the pad 10A. The first side of the pad 10A may comprise a plurality of printed indicia, such as, for example, a first printed indicia 20, a second printed indicia 22, one or more third printed indicia (not shown in the drawings), or a combination thereof. In embodiments, the first printed indicia 20 and/or the second printed indicia 22 may be, for example, a logotype, a logo, a graphic mark, an a emblem, a symbol, a trademark, a trade dress, a seal, typography, imagery, an advertisement, a promotional-related image or type, a marketing communication, a sponsorship-related image, type, and/or text, a non-personal message to promote and/or sell a product, service, idea, and/or good, or a combination thereof. In an embodiment, the product, service, idea, and/or good may be an online-related or online-accessible product, service, idea, and/or good. For example, the online-related or online-accessible product, service, idea, and/or good may be associated with or indicative of one or more new online user accounts, one or more existing online user accounts, or a combination thereof.

In one or more embodiments, the first side 12 of the pad 10A may also comprise a first machine readable code 24, a second machine readable code 26, at least one first partial machine-readable code 28 (hereinafter "the first partial code 28"), or a combination thereof. The second side 14 of the pad 10A may also comprise the plurality of printed indicia which include the first printed indicia 20, the second printed indicia 22, one or more third printed indicia, and or a combination thereof. The second side 14 of the pad 10A may also comprise at least one second partial machine-readable code 30 (hereinafter "the second partial code 30") which may be abutted against or assembled, combined, and/or aligned with the first partial code 28 to assemble, form, produce, provide, and/or dispose one or more assembled machine-readable codes that may be displayable via the pad 10A. For example, the first partial code 28 may be abutted against or assembled, combined, and/or aligned with the second partial code 28 to form, produce, provide, and/or dispose at least one first assembled machine-readable code 32 (hereinafter "the first assembled code 32") on at least one planar surface or side of the pad 10A, as shown in FIGS. 3 and 6.

Figure 2:
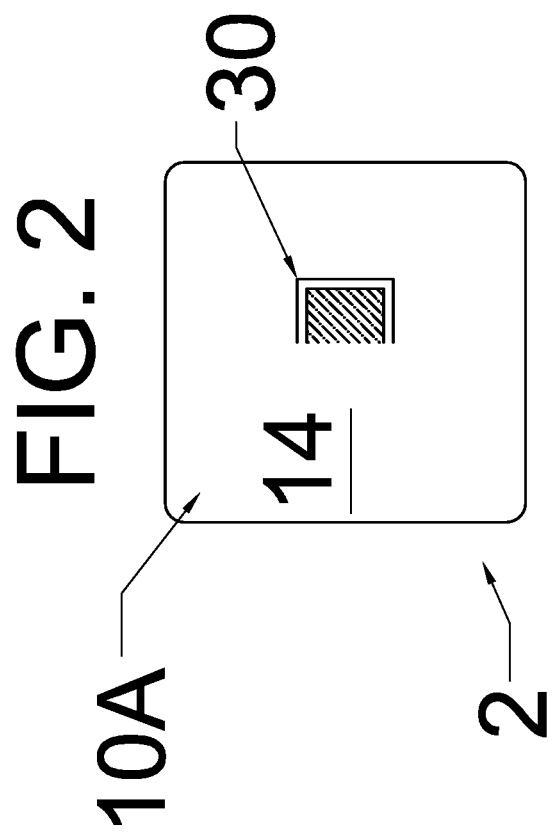
FIG. 2 is a bottom plan view of the display system or item shown in FIG. 1 comprising at least one portion of an assembled machine-readable label, according to one or more examples of the disclosure.
Figure 3:
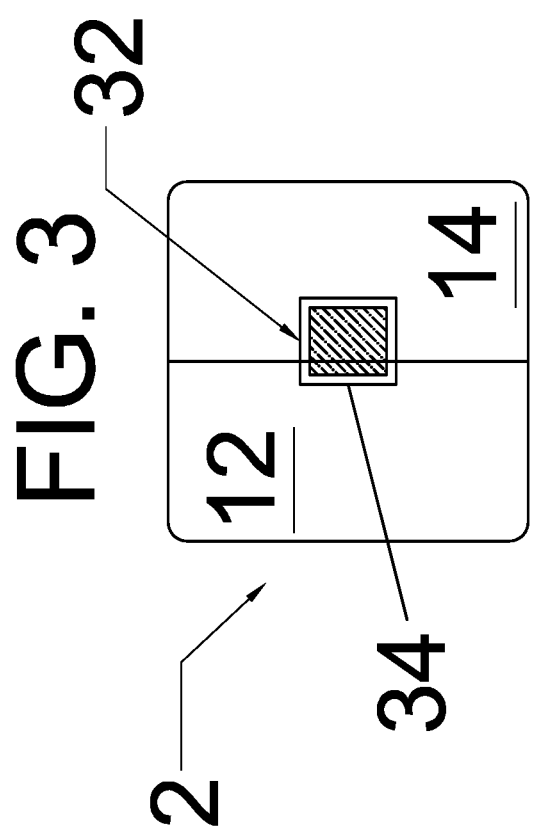
FIG. 3 is a bottom plan view of the display system or item shown in FIGS. 1 and 2, wherein the display system or item is folded onto itself such that an assembled machine-readable label is displayed thereon, according to one or more examples of the disclosure.
Figure 4:
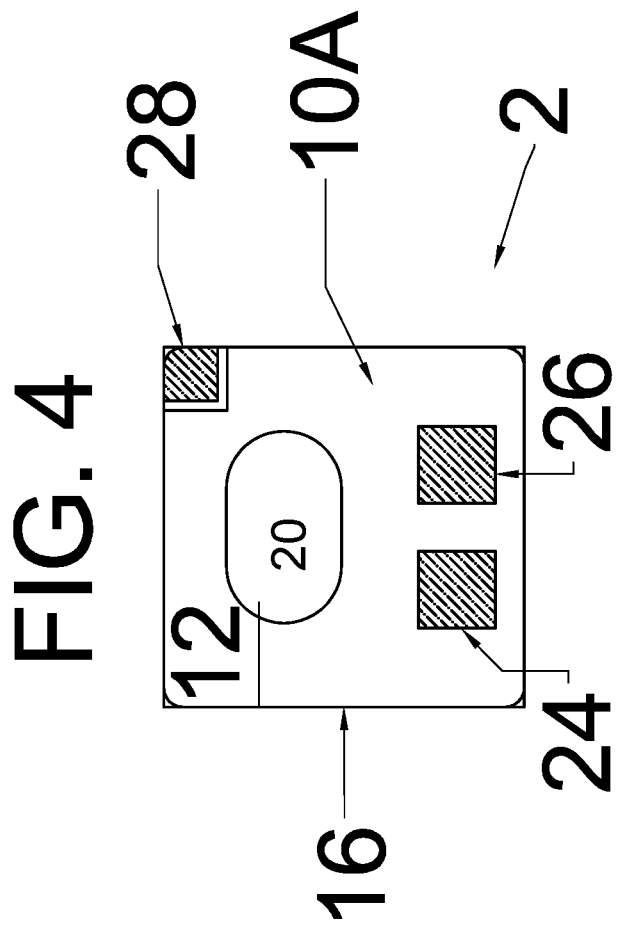
FIG. 4 is a top plan view of a display system or item comprising at least two machine-readable labels and at least one portion of an assembled machine-readable label, according to one or more examples of the disclosure.
Figure 5:
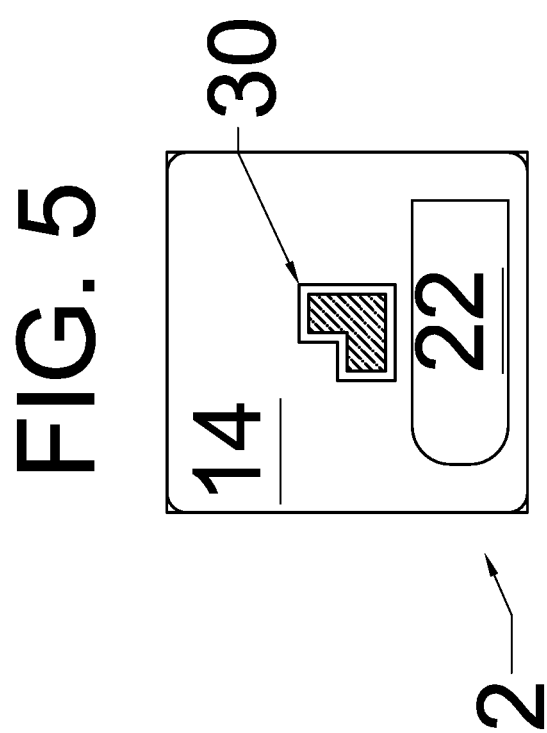
FIG. 5 is a bottom plan view of the display system or item shown in FIG. 4 comprising at least one portion of an assembled machine-readable label, according to one or more examples of the disclosure.
Figure 6:
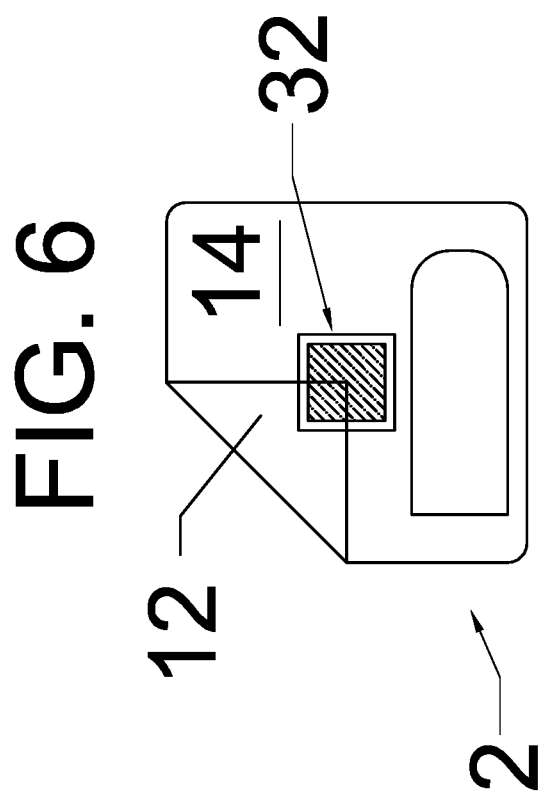
FIG. 6 is a bottom plan view of the display system or item shown in FIGS. 4 and 5, wherein the display system or item is folded onto itself such that an assembled machine-readable label is displayed thereon, according to one or more examples of the disclosure.
Figure 7:
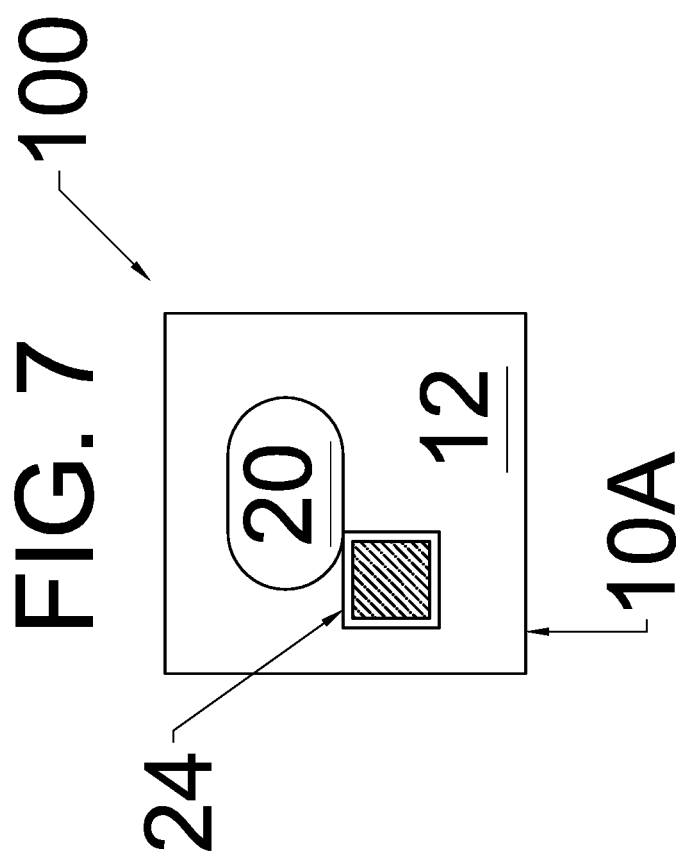
FIG. 7 is a top plan view of a display system or item comprising at least one machine-readable label and printed indicia, according to one or more examples of the disclosure.
Figure 8:
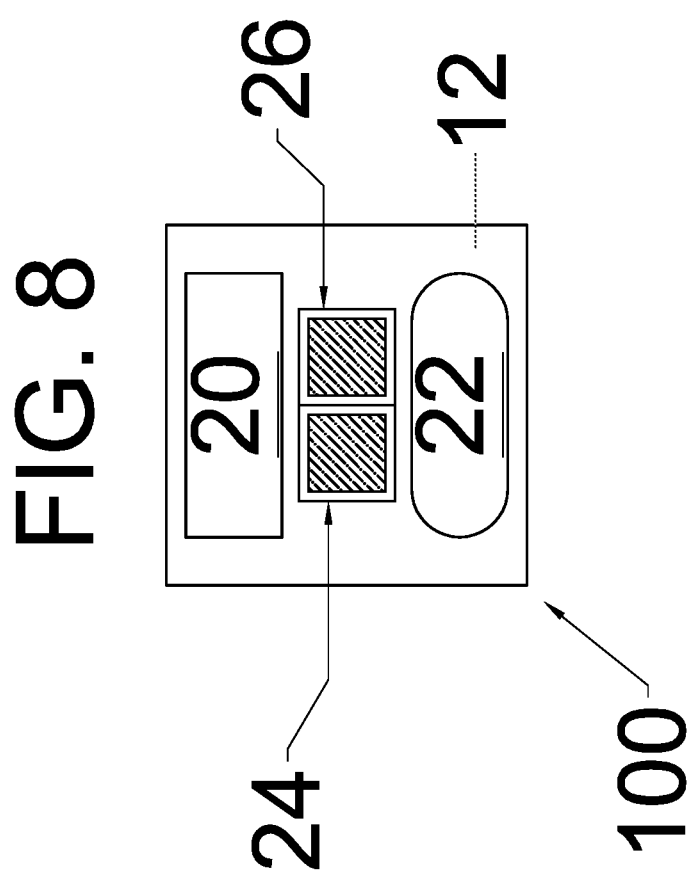
FIG. 8 is a top plan view of a display system or item comprising at least two machine-readable labels and printed indicia, according to one or more examples of the disclosure.
Figure 9:
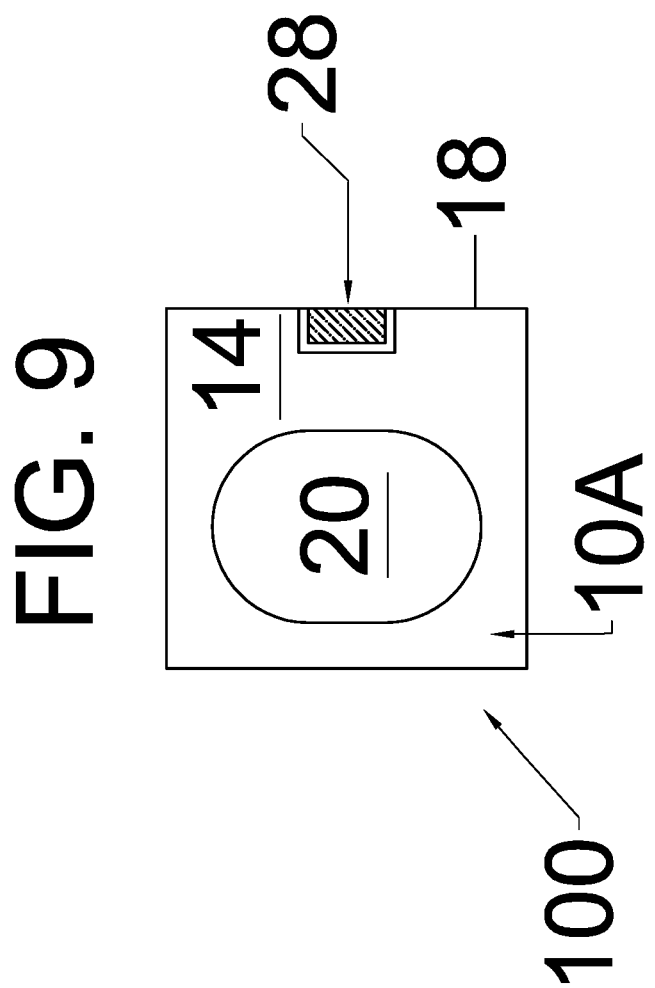
FIG. 9 is a bottom plan view of the display system or item as shown in FIG. 7 or FIG. 8 comprising at least one portion of an assembled machine-readable label and printed indicia, according to one or more examples of the disclosure.

In embodiments shown in FIGS. 3 and 6, the pad 10A may be folded, bent, or rolled onto itself such that the first side 12 and the second side 14 at least partial overlap each other and/or align with each other. As a result of the folding, bending, or rolling of the pad 10A, the first partial code 28 may abut against or assemble, combine, and/or align with the second partial code 30 to assemble, form, produce, provide, and/or dispose the first assembled code 32 on the pad 10A. In embodiments, at least one portion of the pad 10A may be abutted against or folded, bent, or rolled over onto itself to assemble, form, produce, provide, and/or dispose the first assembled code 32 on the pad 10A. In an embodiment, the at least one portion of the pad 10A may be abutted, folded, bent, or rolled may comprise about one-third, about one-quarter, or less than about one-half of the length or width of the pad 10A as shown in FIGS. 1-6. In FIGS. 1-3, the assembly edge 18 of the pad 10A overlaps onto the second side 14 of the pad 10A such that the first partial code 28 and the second partial code 30 (collectively referred to hereinafter "the first and second partial codes 28, 30") abut, assemble, combine, or align to form, produce, and/or provide the first assembled code 32 on the pad 10A. For example, FIGS. 4-6 illustrate at least one corner of the pad 10A being folded, bent, and/or rolled onto a remaining portion of the pad 10A such that the first partial code 28 is abutted against or assembled, combined, and/or aligned with the second partial code 32 to assemble, form, produce, provide, and/or dispose the first assembled code 32 on the pad 10A. In one or more embodiments, one or more corners of the pad 10A may be curved and/or rounded or may be straight and/or come to a point or apex. In an embodiment, the assembly edge 18 of the pad 10A may abut against at least one edge or a portion of a perimeter of the second partial code 30 such that the first partial code 28 and the second partial code 30 abut, assemble, combine, or align with each other to form, produce, and/or provide the first assembled code 32.

Figure 10:
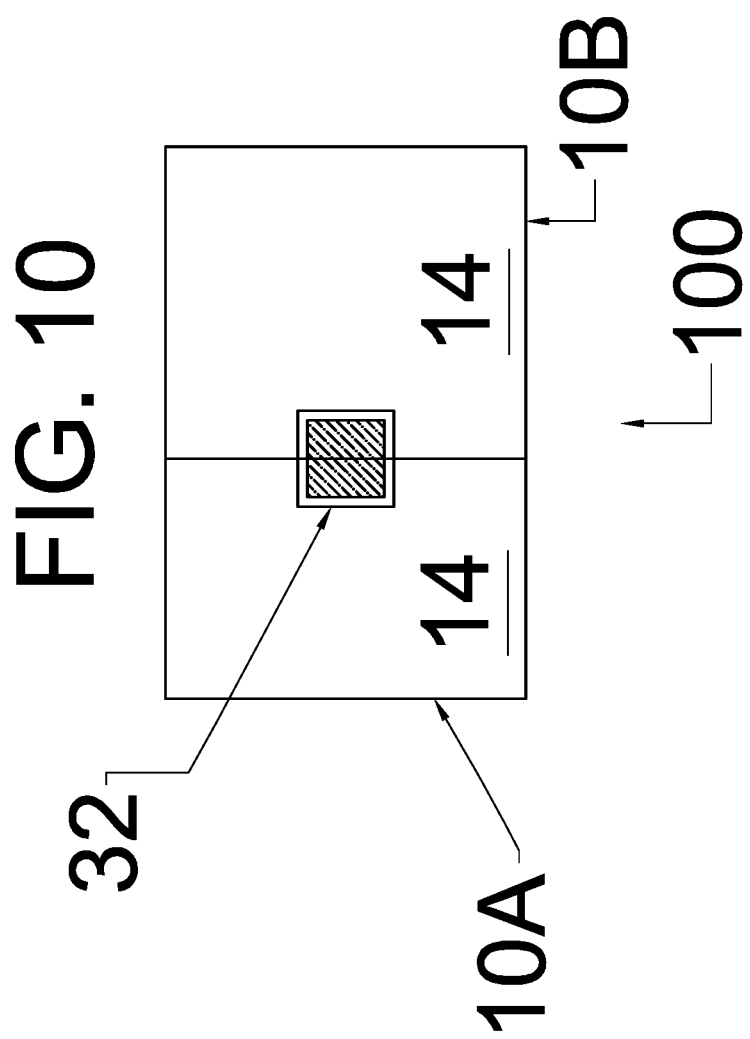
FIG. 10 is a bottom plan view of two display systems or items as shown in FIG. 9 abutting each other such that an assembled machine-readable label is displayed thereon, according to one or more examples of the disclosure.
Figure 11:
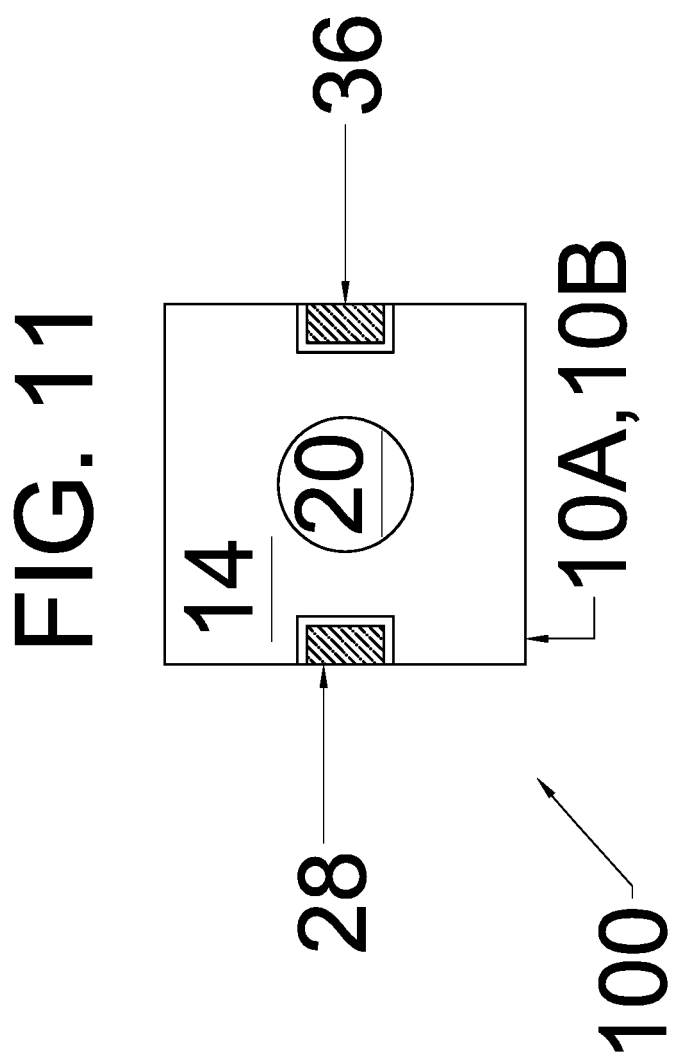
FIG. 11 is a bottom plan view of the display system or item as shown in FIG. 7 or FIG. 8 comprising printed indicia and at least two portions of a plurality of assembled machine-readable labels, according to one or more examples of the disclosure.
Figure 12:
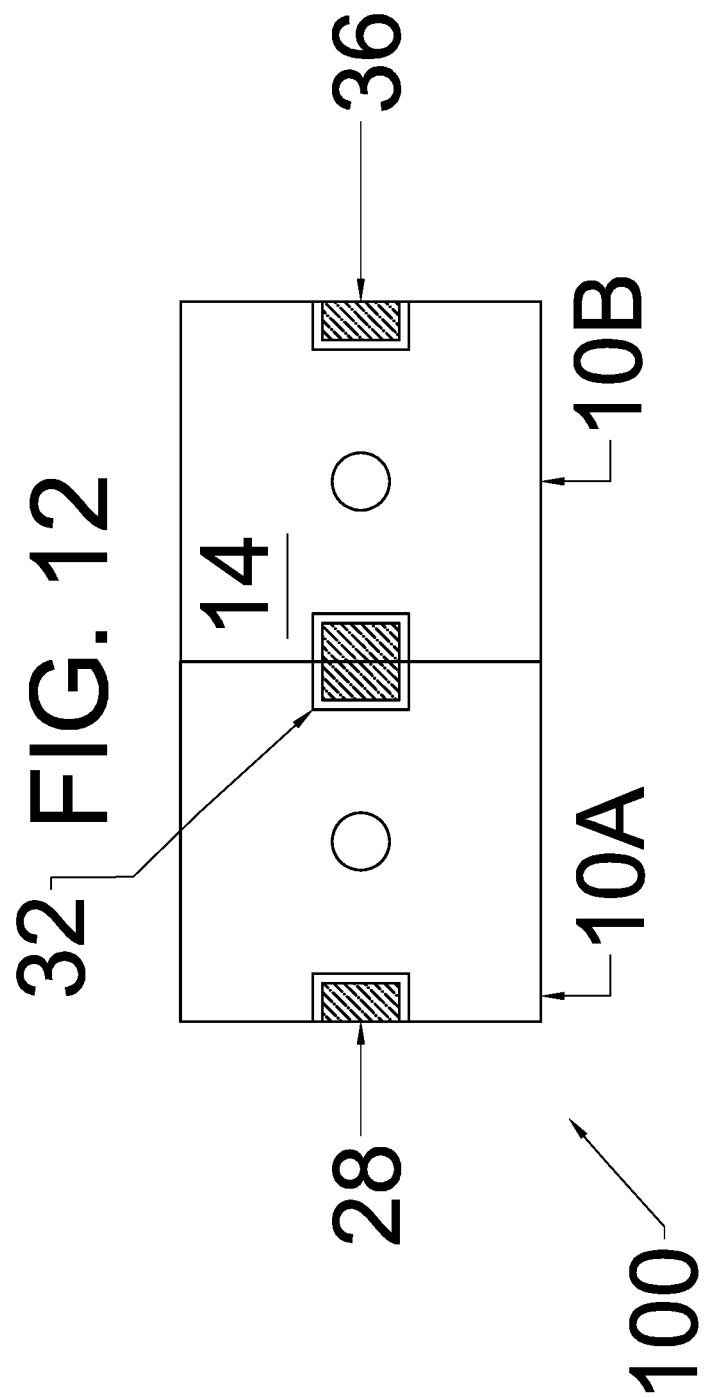
FIG. 12 is a bottom plan view of two display systems or items as shown in FIG. 11 abutting each other such that an assembled first machine-readable label is displayed thereon, according to one or more examples of the disclosure.

In one or more embodiments, the systems and methods disclosed herein may comprise a first displaying system 100 (hereinafter "the system 100") as shown in FIGS. 7-13. In some embodiments, the system 100 may comprise the first pad 10A and a second pad 10B which may be abutted against each other or assembled, combined, and/or aligned with respect to each other to assemble, form, produce, provide, and/or dispose the first assembled code 32 on a side of the system 100 as shown in FIG. 10. The second pad 10B maybe the same as or substantially the same as the first pad 10A and/or may comprise or consist of one or more structural features of the first pad 10A. Therefore, the second pad 10B may comprise the same or substantially the same structural elements and/or structural features as provided by the pad 10A. In other words, the second pad 10B may comprise the first side 12, a second side 14, the perimeter 16, the assembly edge 18 in addition to the first print indicia 20, the second indicia 22, one or more third indicia, the first machine readable code 24, the second machine readable code 26, the first partial code 28, the second partial code 30, and/or a combination thereof. The first pad 10A and the second pad 10B (collectively referred to hereinafter as "the first and second pads 10A, 10B") may be abutted against or assembled, combined, and/or aligned at the assembly edges 18 of the first and second pads 10A, 10B such that the first partial codes 28 of the first and second pads 10A, 10B may abut, assemble, combine, and/or align with each other to assemble, form, produce, provide, and/or dispose the first assembled code 32 on the system 100 as shown in FIGS. 10 and 12.

Figure 13:
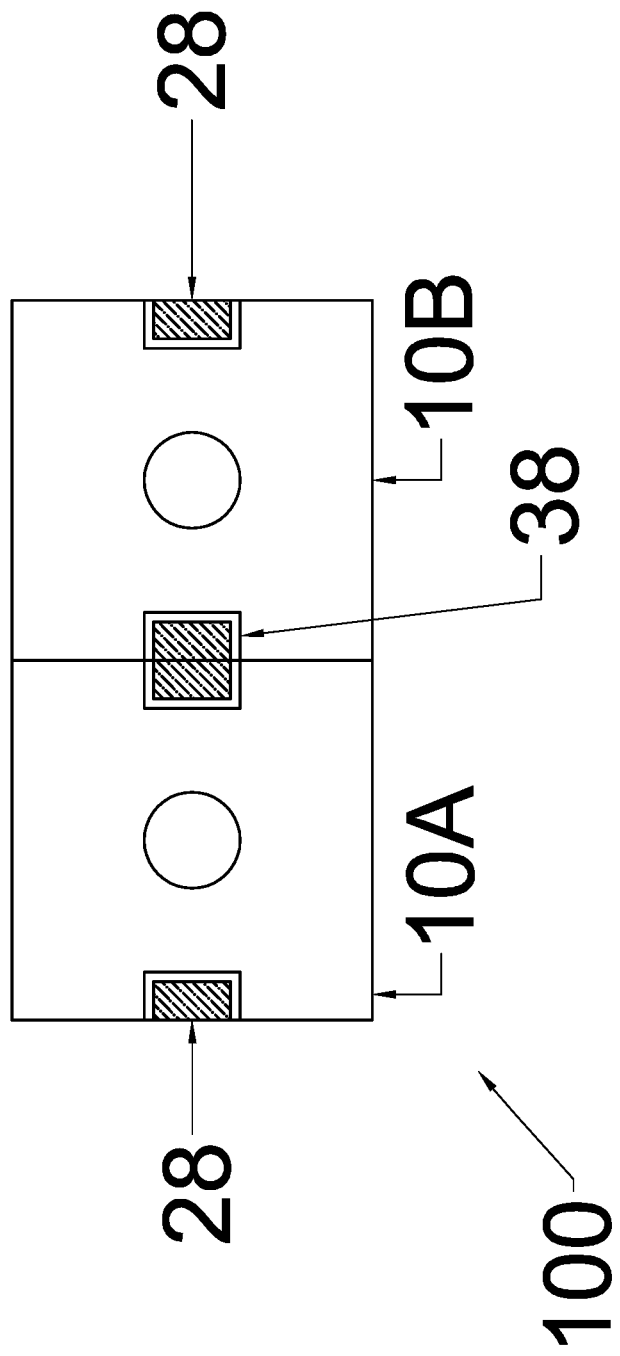
FIG. 13 is a bottom plan view of two display systems or items as shown in FIG. 11 abutting each other such that an assembled second machine-readable label is displayed thereon, according to one or more examples of the disclosure.
Figure 14:
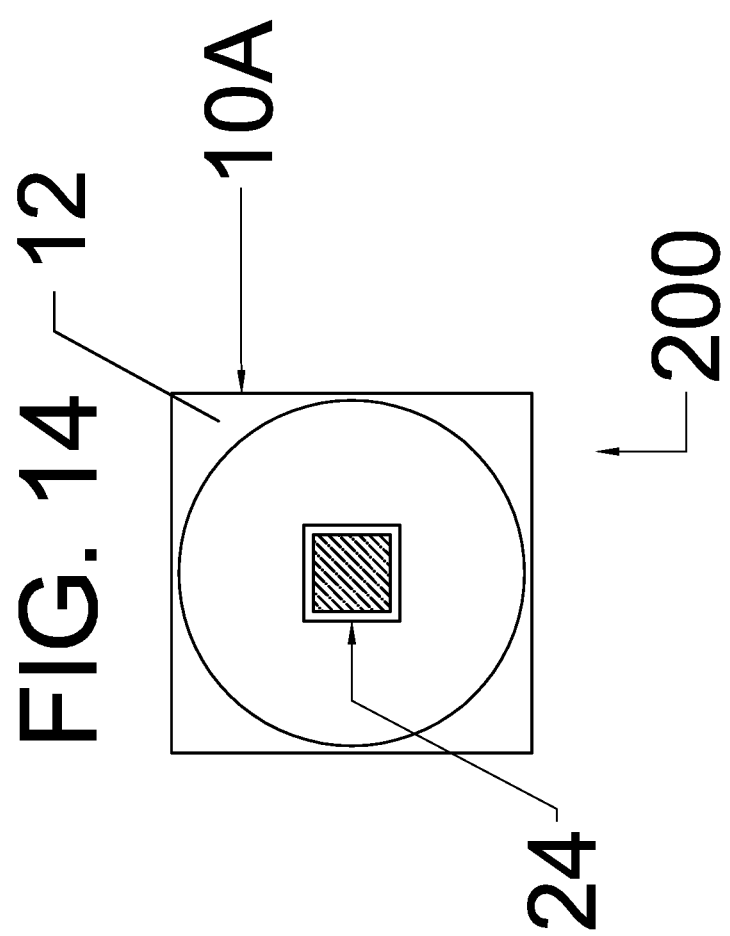
FIG. 14 is a top plan view of a display system or item comprising at least one first machine-readable label and printed indicia, according to one or more examples of the disclosure.
Figure 15:
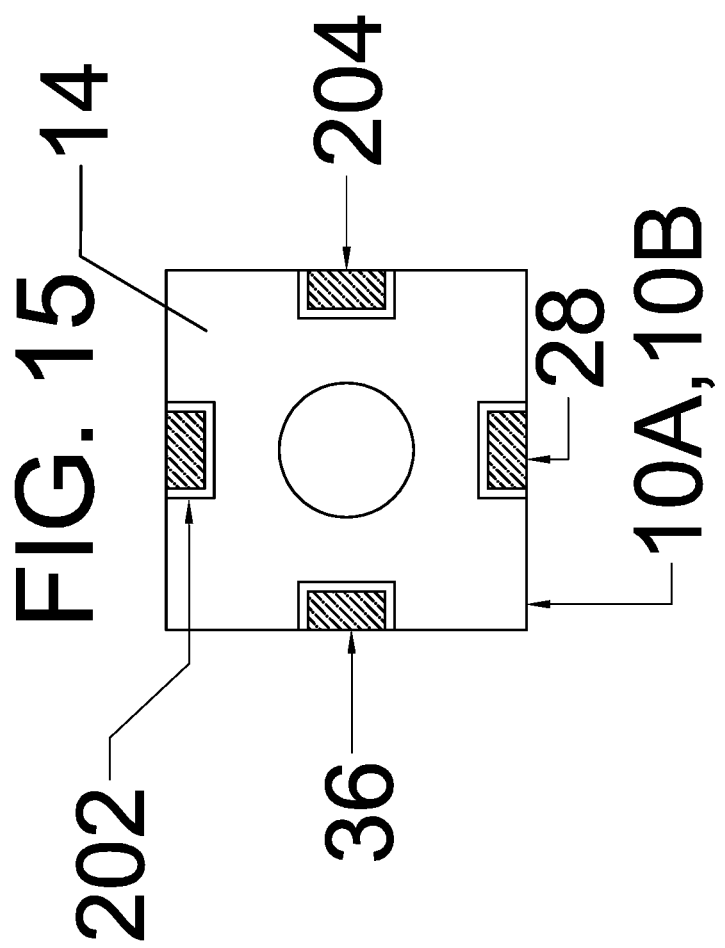
FIG. 15 is a bottom plan view of the display system or item as shown in FIG. 7, FIG. 8, or FIG. 10 comprising at least four portions of a plurality of assembled machine-readable labels, according to one or more examples of the disclosure.

In one or more embodiments, the system 100 may comprise the first partial code 28 and at least one second partial machine-readable code 36 (hereinafter "the second partial code 36") as shown in FIGS. 11-13. In a first assembled configuration, the first and second pads 10A, 10B of the system 100 may be abutted, assembled, combined, and/or aligned with each other such that the first assemble code 32 is provided or displayed on a side of the system 100 as shown in FIGS. 10 and 12. In the first assembled configuration, the second partial code 36 of the first pad 10A abuts, aligns, assemblies, and/or combines with the first partial code 28 of the second pad 10B at the assembly edges 18 of the first and second pads 10A, 10B to assemble, form, produce, provide, and/or dispose the first assembled code 32 on one side of the system 100. As a result of this first assembled configuration, the first assembled code 32 is displayed for machine reading and/or scanning by an optical scanner, a portable digital device, and/or an imaging device of a handheld digital device (not shown in the drawings).

In a second assembled configuration, the first and second pads 10A, 10B may be abutted, assembled, combined, and/or aligned with each other such that at least one second assembled machine-readable code 38 (hereinafter "the second assembled code 38") is provided or displayed on one side of the system 100 as shown in FIG. 13. In the second assembled configuration, the second partial code 36 of the first pad 10A abuts, aligns, assemblies, and/or combines with the second partial code 36 at the assembly edges 18 of the pads 10A, 10B to assemble, form, produce, provide, and/or dispose the second assembled code 38 on one system of the system 100. As a result of the second assembled configuration or alignment, the second assembled code 32 is displayed for machine reading and/or scanning by an optical scanner, a portable digital device, and/or an imaging device of a handheld digital device (not shown in the drawings). Thus, the first and second pads 10A, 10B of the system 100 may be assembled, aligned, and/or combined with each other such that either the first assembled code 32 or the second assembled code 38 is displayed or visible on one side of the system 100 for machine reading and/or scanning by an optical scanner, a portable digital device, and/or an imaging device of a handheld digital device (not shown in the drawings).

In one or more embodiments, the systems and methods disclosed herein may comprise at least one second displaying system 200 (hereinafter "the system 200") configured or adapted for displaying a plurality of assembled machine-readable codes which may comprise the first assembled code 32, the second assembled code 38, one or more third or fourth assembled codes 206, or a combination thereof, as shown in FIGS. 14-22. For example, the first and second pads 10A, 10B of the system 200 may comprise a plurality of partial machine-readable codes (i.e., first partial code 28, second partial code 26, third partial code 202, fourth partial code 204, one or more fifth partial codes, or a combination thereof) disposed along a plurality of assembly edges 18 at the perimeters 16 of the first and second pads 10A, 10B.

In some embodiments, the first and second pads 10A, 10B may comprise a plurality of machine-readable codes (i.e., first assembled code 32, second assembled code 38, third or fourth assembled code 206, one or more fifth assembled codes, or a combination thereof). For example, the first and second pads 10A, 10B may be abutted, aligned, arranged, configured, and/or assembled such that the first and second pads 10A, 10B may display thereon at least one of the first machine-readable code 24, the second machine-readable code 26, the first assembled code 32, the second assembled code 38, one or more third or fourth assembled codes 206, or a combination thereof. The first and second pads 10A, 10B may also comprise a plurality of partial machine-readable codes that may be abutted, assembled, combined, and/or aligned with each other to assemble, form, produce, provide, and/or dispose the first assembled code 32, the second assembled code 38, and/or the one or more third or fourth assembled codes 206, one or more fifth assembled codes on at least one side of the system 200. For example, the plurality of partial machine-readable codes of the system 200 may comprising one or more first partial codes 28, one or more second partial codes 30, one or more third partial machine-readable codes 202, one or more fourth partial machine-readable codes 204, one or more fifth partial machine-readable codes, or a combination thereof (collectively referred to hereinafter as "the partial codes 28, 30, 202, 204") as shown in FIGS. 15-22. The plurality of partial machine-readable codes of the system 200 may be abutted together or assembled, combined, and/or aligned together to assemble, display, form, produce, provide, and/or dispose the first assembled code 32, the second assembled code 38, and/or the one or more third assembled machine-readable codes 206 on at least one side of the system 200.

Figure 16:
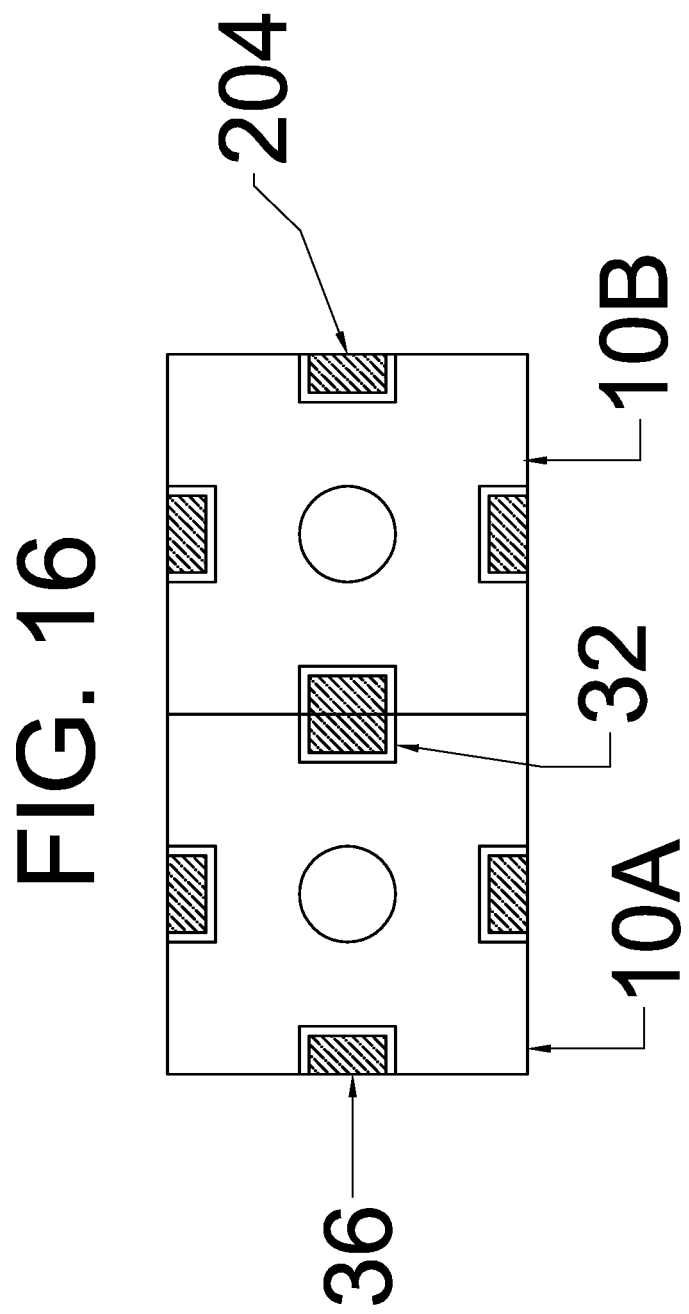
FIG. 16 is a bottom plan view of two display systems or items as shown in FIG. 15 abutting each other such that an assembled first machine-readable label is displayed thereon, according to one or more examples of the disclosure.
Figure 17:
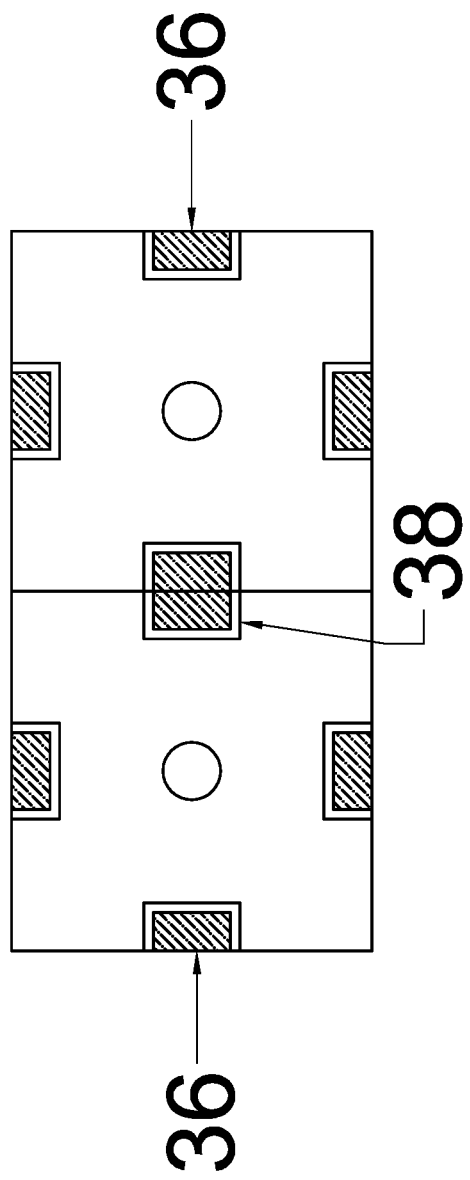
FIG. 17 is a bottom plan view of two display systems or items as shown in FIG. 15 abutting each other such that an assembled second machine-readable label is displayed thereon, wherein the assembled first and second machine-readable labels is two of sixteen assembled machine-readable labels that may be displayed thereon by the two display systems or items, according to one or more examples of the disclosure.
Figure 18:
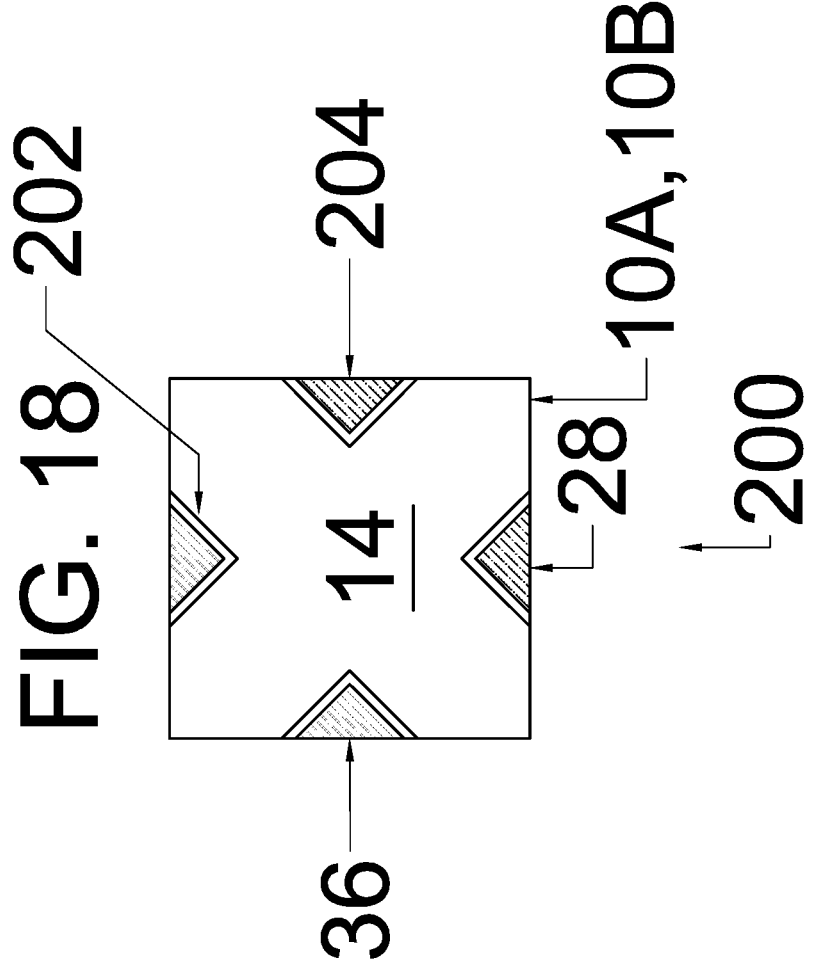
FIG. 18 is a bottom plan view of the display system or item as shown in FIG. 7, FIG. 8, or FIG. 10 comprising at least four portions of at least sixteen assembled machine-readable labels that may be displayed, according to one or more examples of the disclosure.
Figure 19:
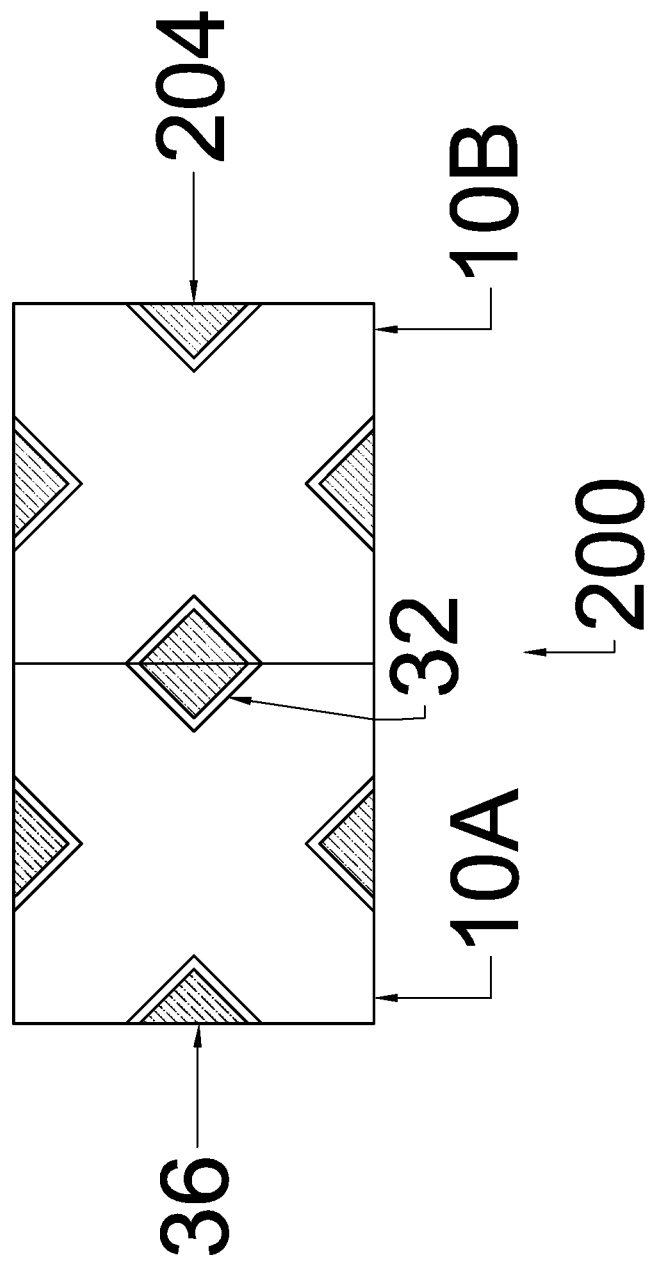
FIG. 19 is a bottom plan view of two display systems or items as shown in FIG. 18 abutting each other such that an assembled first machine-readable label or an assembled second machine-readable label is displayed thereon, wherein the assembled first or assembled second machine-readable label is one of the sixteen assembled machine-readable labels that may be displayed thereon by the two display systems or items, according to one or more examples of the disclosure.
Figure 20:
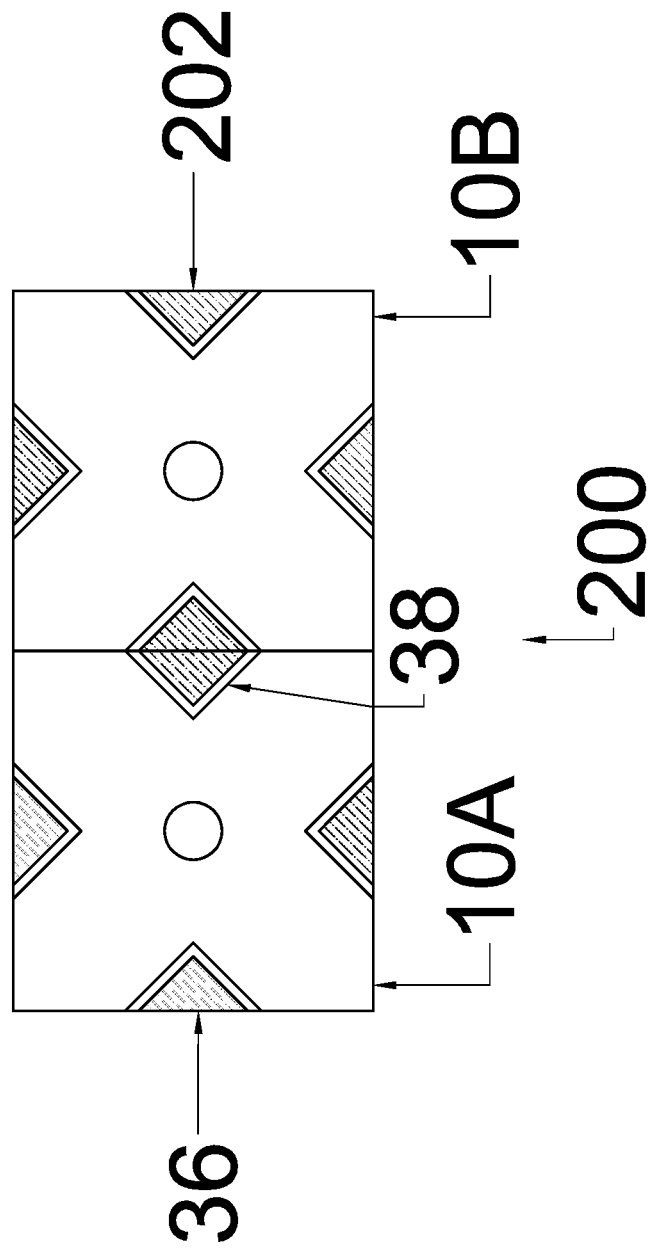
FIG. 20 is a bottom plan view of two display systems or items abutting each other such that an assembled first machine-readable label is displayed thereon, according to one or more examples of the disclosure.
Figure 21:
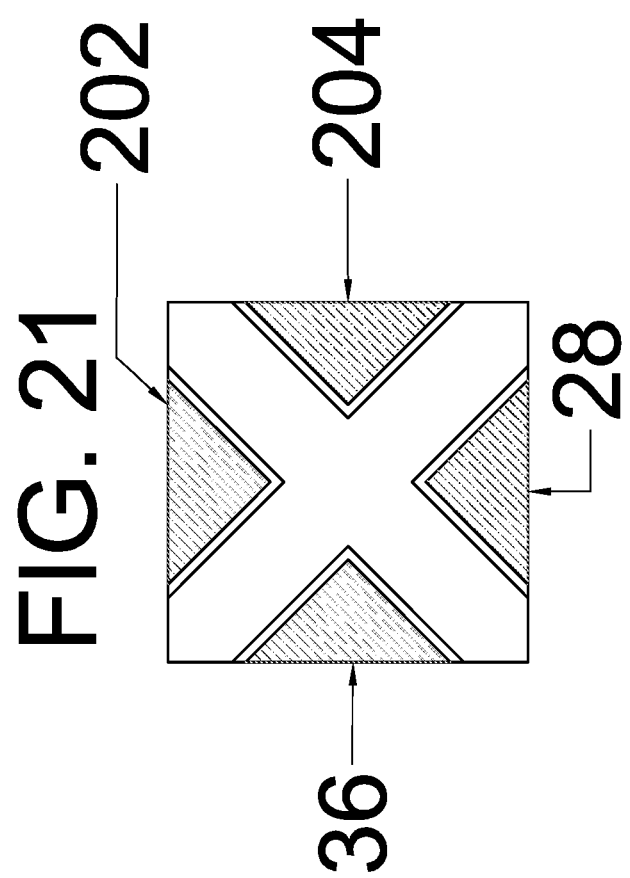
FIG. 21 is a bottom plan view of the display system or item as shown in FIG. 7, FIG. 8, or FIG. 10 comprising at least four portions of at least sixteen assembled machine-readable labels that may be displayed, according to one or more examples of the disclosure.

In one or more embodiments, the first and second pads 10A, 10B may be rotated, turned, spun, adjusted, aligned, and/or moved with respect to each other at least twice such that the system 200 may assemble, display, form, produce, provide and/or dispose a plurality of assembled machine-readable codes on one side of the system 200, wherein the plurality of assembled machine-readable codes comprise at least sixteen (16) different assembled machine-readable codes. For example, when the first and second pads 10A, 10B of the system 200 are abutted together in the first assembled configuration, the first assembled code 32 may be displayed or is visible on one side of the system 200 as shown in FIGS. 16 and 19. When the first and second pads 10A, 10B of the system 200 are abutted together in the second assembled configuration, the second assembled code 38 may be displayed or is visible on one side of the system 200 as shown in FIGS. 17 and 20. Additionally, when the first and second pads 10A, 10B of the system 200 are abutted together in at least one third assembled configuration, one or more third or fourth assembled machine-readable codes 206 (hereinafter "the third assembled codes 206") may be displayed or visible on at least one side of the system 200 as shown in FIG. 22. In an embodiment, the third assembled codes 206 comprise at least seven or at least fourteen different assembled machine-readable codes.

In one or more embodiments, the systems and methods disclosed herein comprise a third displaying system 300 (hereinafter "the system 300") configured or adapted for displaying the plurality of assembled machine-readable codes on at least one side of the system 300 as shown in FIG. 23. In embodiments, the system 300 may comprise the first and second pads 10A, 10B, a third pad 10C, or a combination thereof, and the third pad 10C may comprise the first printed indicia 20, the second printed indicia 22, the first partial code 28, the second partial code 306, the one or more third partial machine-readable codes 202, or a combination thereof. The first and second pads 10A, 10B and the third pad 10C (hereinafter "the pads 10A, 10B, 10C") may be abutted, rotated, turned, spun, adjusted, aligned, and/or moved at least twice with respect to each other such that the system 300 may display the plurality of assembled machine-readable codes. For example, the assembled machine-readable codes that may be displayable via the system 300 may comprise the first assembled code 32, the second assembled code 38, the third assembled codes 206 as shown in FIG. 23, or a combination thereof. In an embodiment, the assembled machine-readable codes of the system 300 may comprise at least nine different machine-readable codes and/or the third assembled codes 206 of the system 300 may comprise at least seven different machine-readable codes.

In one or more embodiments, the systems and methods disclosed herein may comprise a displaying system 400 (hereinafter "the system 400") configured or adapted for displaying the plurality of assembled machine-readable codes, the first machine-readable code 24, the second machine-readable code 26, or a combination thereof. The system 400 may comprise a holder or tray 402 (hereinafter "the tray 420") sized, configured, and/or adapted for receiving the first and second pads 10A, 10B of the systems 100 or 200 as shown in FIG. 24. The tray 402 abuts and/or aligns the first and second pads 10A, 10B with each other such that the system 400 may display the plurality of assembled machine-readable codes that are visible and displayable for machine reading or scanning by an optical scanner, a portable digital device, and/or an imaging device of a handheld digital device (not shown in the drawings). The first assembled code 32, the second assembled code 38, and/or the third assembled codes 206 may be assembled, displayed, formed, produced, provided, and/or disposed on one side of the system 400 by placing, moving, inserting and/or disposing the first and second pads 10A, 10B into the tray 402. In an embodiment, the tray 402 may comprise at least one aligning element selected from at least one rib, at least one lip, at least one tap, at least one wall, at least one flange, or a combination thereof. In embodiments, the at least one aligning element may be raised, extended, or non-planar with one or more planar surfaces of the tray 402. For example, the tray 402 may comprise one or more raised ribs for aligning the first and second pads 10A, 10B such that the system 400 may display at least one assembled machine-readable codes of the plurality of assembled machine-readable codes, such as, the first assembled code 32 as shown in FIG. 24, the second assembled code 38, the third assembled code 206, one or more fifth assembled codes, or a combination thereof.

In some embodiments, the systems and methods disclosed herein may comprise or consist of the first pad 10A configured or adapted for displaying at least one assembled machine-readable code of the plurality of machine-readable codes, such as, for example, the first assembled code 32 as shown in FIG. 25. In an embodiment, each corner of the first pad 10A may be folded, bent, and/or rolled back onto one or more remaining portions of the first pad 10A such that the first partial code 28, the second partial code 30, and the one or more third partial codes 202 abut, assemble, combine, and/or align with each other to form the first assembled code 32, the second assembled code 38, the third assembled code 206, or one or more fifth assembled codes. Moreover, the second assembled code 38 may be formed or displayed by flipping the first pad 10A over and folding, bending, and/or rolling the reverse-side corners back onto the remaining portion of the pad 10A (not shown in the drawings).

In one or more embodiments, the systems and methods disclosed herein may comprise a displaying system 500 configured or adapted for displaying the plurality of assembled machine-readable codes, the first machine-readable code 24, the second machine-readable code 26, the third assembled code 206, or at least one additional assembled machine-readable code 502 as shown in FIG. 26. The system 500 may comprise a holder or tray 504 (hereinafter "the tray 504") sized, configured, and/or adapted for receiving the pads 10A, 10B, 10C and a fourth pad 10D (collectively referred to hereinafter as "the pads 10A, 10B, 10C, 10D") of the system 500 as shown in FIG. 26. The tray 504 may comprise the at least one aligning element disclosed herein such that the tray 504 may abut and/or align the pads 10A, 10B, 10C, 10D with each other. As a result, the system 500 may display the plurality of assembled machine-readable codes are visible for machine reading or scanning by an optical scanner, a portable digital device, and/or an imaging device of a handheld digital device (not shown in the drawings). The first assembled code 32, the second assembled code 38, the third assembled code 206, and/or the additional assembled code 502 may be assembled, displayed, formed, produced, provided, and/or disposed on one side of the system 500 by abutting, placing, moving, inserting and/or disposing the pads 10A, 10B, 10C, 10D into the tray 504. In an embodiment, the tray 504 may comprise at least one additional aligning and/or raised element selected from at least one rib, at least one lip, at least one tap, at least one wall, at least one flange, or a combination thereof. For example, the tray 504 may comprise one or more ribs for aligning the pads 10A, 10B, 10C, 10D such that the system 500 may display at least one assembled machine-readable codes of the plurality of assembled machine-readable codes, such as, the fourth assembled code 502 as shown in FIG. 26.

In one or more embodiments, the first machine-readable code 24, the second machine-readable code 26, the first assembled code 32, the second assembled code 38, the third assembled code 206, the additional assembled code 502 (collectively referred to hereinafter as "the codes 24, 26, 32, 38, 206, 502") or a combination thereof may be, comprise, consist of, or contain machine-readable data that points or is directed to one or more online websites/webpages. In some embodiments, the one or more online websites/webpages may comprise or may consist of, for example, at least one online new account website/webpage configured or adapted to generate and/or create a new online user account for at least one new account user, at least one online existing account website/webpage configured or adapted to open, access, and/or login to an existing online user account for at least one existing account user, and/or at least one online reward website/webpage configured or adapted to transfer, assign, transmit, and/or provide the one or more online rewards disclosed herein to the at least one new account user, the at least one existing account user, or a combination thereof. The codes 24, 26, 32, 38, 206, 502 formable, displayable and/or readable by the systems and methods disclosed herein may be configured for generating or creating new online user accounts and/or new online account users and rewarding newly generated online user accounts, new online account users, one or more existing user accounts, one or more existing account users, or a combination thereof. The codes 24, 26, 32, 38, 206, 502 disposed, displayed, or visible on the present systems and methods may drive or direct one or more new account users to one or more online new account websites/webpages for opening or creating new online user accounts and/or one or more existing account users to the one or more online existing websites/webpages for opening, accessing, and/or logging into or accessing existing online user accounts. The one or more online new and/or existing websites/webpages and/or the new and/or existing online user accounts may be owned, operated, controlled, accessible, supervised, facilitated, and/or deployed by one or more online-service providers, one or more online-goods providers, or a combination thereof. In some embodiments, the one or more online new and/or existing websites/webpages and/or the online new and/or existing user accounts may be owned, operated, controlled, accessible, supervised, facilitated, and/or deployed by one or more internet service providers, one or more email providers, one or more news providers, one or more entertainment providers, one or more gaming providers, one or more search engine providers, one or more e-commerce providers, one or more banking providers, one or more healthcare providers, one or more government agencies, one or more social media providers, one or more charity providers, one or more stream media content providers, one or more auction house providers, one or more one or more online service providers, or a combination thereof. In embodiments, the one or more online websites/webpages and/or the online accounts may be owned, operated, controlled, accessible, and/or deployed by one or more online shopping providers, one or more online advertising providers, one or more online game providers, one or more online banking providers, one or more online casino providers, one or more online gambling providers, one or more online dating service providers, one or more online data processing providers, one or more online media providers, one or more online entertainment providers, one or more online streaming media content providers, one or more subscription-based providers, one or more online food providers, one or more prescription-based providers, one or more online medical-based providers, one or more online healthcare-based providers, one or more online educational providers, one or more online podcast providers, one or more online music providers, one or more online sports-based providers, or a combination thereof. In other embodiments, the one or more online websites/webpages and/or the online accounts may be owned, operated, controlled, accessible, and/or deployed by one or more augmented reality providers, one or more mobile operating systems, one or more virtual stores, one or more payment providers, one or more website login pages, one or more restaurant service providers, one or more Wi-Fi network providers, one or more funerary service providers, one or more electronic authentication service provider, one or more video game providers, one or more loyalty program providers, one or more counterfeit detection providers, one or more product tracing providers or services, one or more pandemic-related health providers, or a combination thereof. In an embodiment, the one or more online websites/webpages and/or the online accounts may be owned, operated, controlled, accessible, and/or deployed by one or more blockchain-based goods or services provider, one or more cryptocurrency-based goods or services provider, one or more cryptocurrency trading platform and/or exchange providers, one or more banking as a service providers, one or more blockchain as a service providers, one or more content as a service providers, one or more data as a service providers, one or more desktop as a service providers, one or more database as a service providers, one or more electric vehicle as a service providers, one or more function as a service providers, one or more games as a service providers, one or more identity as a service providers, one or more infrastructure as a service providers, one or more integration platform as a service providers, one or more IT as a service providers, one or more knowledge as a service providers, one or more logging as a service providers, one or more lighting as a service providers, one or more mobility as a service providers, one or more monitoring as a service providers, one or more mobile backend as a service providers, one or more network as a service providers, one or more payments as a service providers, one or more platform as a service providers, one or more quality assurance as a service providers, one or more recovery as a service providers, one or more robot as a service providers, one or more security as a service providers, one or more software as a service providers, one or more sustainability as a service providers, one or more time series database as a service providers, one or more unified communications as a service providers, or a combination thereof.

In some embodiments, the codes 24, 26, 32, 38, 206, 502 may be machine-readable codes that are utilized to conduct business and/or provide services in one or more industries which may include at least one selected from retailers, cities and cultures, software and game developers, musicians and artists, publishers, business services, hotels and restaurants, governments, photographers and videographers, home repairs and maintenance, finance and insurance companies, event management, stadiums and convention centers, personal uses, non-for-profit uses, consumer packaged goods, tourism, public transportation, consumer electronics, healthcare and doctors, graphic design studios, museums and galleries, real estate agencies, gyms and wellness, casino, betting, and/or gambling, fantasy sports and/or entertainment, business consultants, educational institutions, restaurants, collectible card gaming and/or trading card gaming, tabletop gaming and digital collectible card gaming, or a combination thereof.

In one or more embodiments, the assembled codes 24, 26, 32, 38, 206, 502 may be, comprise, consist of, and/or include at least one machine-readable barcode which may be at least one linear barcode, at least one matrix 2D barcode, or a combination thereof. In some embodiments, the at least one linear barcode may be, comprise, consist of, and/or include at least one of the following linear barcodes: a postal barcode, a codabar, a "code 25", a "code 11", a "code 32", a "code 39", a "code 49", a "code 93", a "code 128", a CPC binary code, a film barcode, an "EAN 2 code", an "EAN 5 code", and "EAN-8 code" or "EAN-13 code", a facing identification mark code, a "GS1-128 code", a mail code, an "ITF-14 code", an "IFT-6 code", a JAN code, a MSI code, a pharmacode, a Plessey code, a postbar code, a UPC-A code, a UPC-E code, or a combination thereof. In embodiments, the at least one matrix 2D barcode may be, comprise, consist of, and/or include at least one of the following matrix 2D barcodes: AR code, Aztec code, bCode, BEEtag code, BeeTagg code, Bokode code, boxing code, "Code 1", "Code 16K", colorcode, a color construct code, a cronto visual cryptogram code, a cybercode, a d-touch code, a dataglyphs code, a data matrix code, a datastrip code, a digimarc barcode, a digital paper code, a dotcode, DWcode, EZcode, a high capacity color barcode, a huecode, an intercode, a JAB code, a Maxicode, a mCode, a MMCC code, a Nexcode, a "ODF417 code", a Qode, a QR code, a screencode, a Shotcode, a snapcode, a snowflake code, a SPARQCode, a Trilcode, a Voiceye code, or a combination thereof.

In some embodiments, the codes 24, 26, 32, 38, 206, 502 may comprise machine-readable images, data, and/or information that may be surrounded by or enclosed within a margin or quiet zone 34 (hereinafter "the margin 34") as shown in FIG. 1. For example, the codes 24, 26, 32, 38, 206, 502 may be, comprise, consist of, and/or include one or more quick response codes (hereinafter "the QR codes"). In embodiments, the codes 24, 26, 32, 38, 206, 502 may be, comprise, consist of, and/or include at least one "Model 1

QR code", at least one Micro QR code, at least one IQR code, at least one Secure QR code, at least one Frame QR code, at least one HCC2D code, at least one JAB code, or a combination thereof. In an embodiment, the codes 24, 26, 32, 38, 206, 502 may be square-shaped, rectangular-shaped, triangular-shaped, circular- or oval-shaped, or a combination thereof. The codes 24, 26, 32, 38, 206, 502 may comprise and/or include one or more code structure elements, such as, for example, position detection patterns, and/or data area that may be surrounded by or in close by the margin 34. In some embodiments, the position detection patterns and/or data area make comprise at least one selected from version information, format information, and/or error correction keys and/or requirement patterns. In embodiment, the required patterns make comprise at least one of a physical element, an alignment element, a timing element, or a combination thereof. The code structure elements may be and/or may comprise one or more positioning detection markers, one or more alignment markings, one or more timing patterns, version information, format information, one or more data and error correction keys, at least one quite zone (i.e., the margin 34), or a combination thereof. Additionally, the code structure elements may be and/or may comprise at least one static QR code type, at least one dynamic QR code type, or a combination thereof. In an embodiment, the at least one static QR code type may be or may comprise at least one QR code selected from at least one Wi-Fi QR code, at least one cryptocurrency address QR code, at least one plain text QR code, at least one email QR code, at least one online login QR code, at least one online promotional QR code, or a combination thereof. The at least one dynamic QR code type may be or may comprise at least one QR code selected from at least one App Store QR code, at least one PDF QR code, at least one social media QR code, at least one coupon QR code, at least one reward QR code, at least one promotion QR code, at least one gift QR code, at least one discount QR code, at least one business page QR code, at least one vCard plus QR code, at least one video QR code, at least one dynamic URL QR code, at least one image gallery QR code, at least one event QR code, at least one MP3 QR code, at least one feedback QR code, at least one rating QR code, or a combination thereof.

In one or more embodiments, each perimeter 16 of the pads 10A, 10B, 10C, 10D may have the shape of a polygon, such as, for example, a square, a rectangle, a triangle, a quadrilateral, or a combination thereof. Each perimeter of the pads 10A, 10B, 10C, 10D, may comprise, consist of, and/or include at least one flat, planar, and/or straight edge (i.e., at least one assembly edge 18), at least two flat, planar, and/or straight edges (i.e., at least two assembly edges 18), at least three (i.e., at least three assembly edges 18), or at least four flat, planar, and/or straight edges (i.e., at least four assembly edges 18). In some embodiments, the partial codes 28, 30, 202, 204 may be adjacent to, abut or contact, and/or extend to or along the at least one, at least two, at least three, or at least four flat, planar, and/or straight edges. Upon alignment and/or abutting against each other, the partial codes 28, 30, 202, 204 may form, display, produce, and/or provide the assembled codes 32, 38, 206, 504 that are one or more machine-readable codes, such as, for example, one or more machine-readable QR codes. Thus, the codes 24, 26, 32, 38, 206, 502 may be assembled, displayed, formed, produced, provided, or disposed on at least one side of the systems 100, 200, 300, 400, 500 for scanning or reading by one or more imaging devices, one or more digital devices, or one or more handheld mobile devices.

In one or more embodiments, at lead one pad of the pads 10A, 10B, 10C, 10D (collectively referred to hereinafter as "the pads 10A-10D") may be made of at least one material selected from at least one wood-based material, at least one cork-based, at least one paper-based material, at least one plastic-based material, at least one polymer-based material, or at least one composite material comprising or consisting of a combination of the one or more materials disclosed herein. In an embodiment, the at least one material of the pads 10A-10D may provide padding or protection for at least one object disposed onto, directly contacting, or held by the pads 10A-10D. Further, the pads 10A-10D may be utilized to prevent contamination of the at least one object by covering, protecting, restricting access to one or more opens of the at least one object.

In some embodiments, one or more pads of the pads 10A-10D may be, for example, a printed document displaying one or more machine-readable codes of the codes 24, 26, 32, 38, 206, 502. For example, one or more of the pads 10A-10D may be one or more documents acknowledging that a person or user may have received money or property in payment following a sale or other transfer of one or more goods or at least one provision of a service, wherein the one or more documents may display one or more of the codes 24, 26, 32, 38, 206, 502. In an embodiment, one or more of the pads 10A-10D may be, comprise, or consist of at least one receipt, at least one packing list, at least one packing slip, at least one packaging slip, at least one delivery docket, at least one shipping list, at least one delivery list, at least one bill of at least one parcel, at least one manifest, at least one customer receipt, or a combination thereof. In other embodiments, one or more of the pads 10A-10D may be at least one lottery ticket, at least one sweepstakes entry, at least one collectible and/or gaming card, at least one ticket stub, at least one collectible artifact, at least one wearable item or piece, at least one promotional label or advertisement, at least one meal or drink ticket, at least one surface of toy item, or a combination thereof.

In one or more embodiments, a new user may wish to create a new online user account and may scan, for example, the first machine-readable code 24 which may be indicative of opening, generating, or creating a new online user account. Alternatively, an existing account user may wish to access or open an existing online user account by scanning the second machine-readable code 26 that may be indicative of accessing or opening an existing user account. In an embodiment, a single machine-readable code (i.e., either the first machine-readable code 24 or the second machine-readable code 26) may facilitate both opening, generating, or creating a new online user account of at least one new online account user and opening, accessing, or logging into an existing online user account of at least one existing online account user. After opening or creating the new online accounts via scanning the first machine-readable code 24 (or the single machine-readable code) or logging into or accessing the existing online accounts via scanning the second machine-readable code 26 (or the single machine-readable code), the assembled codes 32, 38, 206, 502 disclosed herein may provide, assign, and/or transfer at least one gift, reward, promotional discount, promotional award, and/or payment to one or more new online account users and/or one or more existing online account users. The at least one gift, reward, promotional discount, promotional award, payment, or combination thereof to the one or more new and/or existing online account users may be facilitated by the assembled codes 32, 38, 206, 502 displayable and/or visible on the systems and/or assembled via the methods disclosed herein.

The codes 24, 26, 32, 38, 206, 502 displayed on the present systems and/or abutted and assembled via the present methods may be scannable by portable digital devices, handheld mobile devices, and/or an optical scanner of one or more new and/or existing online account users which may direct or push the portable digital devices and/or handheld mobile devices to the online websites/webpages disclosed herein and transfer, assign, or distribute the at least one gift, reward, promotional discount, promotional award, and/or payment to the one or more new and/or existing online account users. As a result of scanning the codes 24, 26, 32, 38, 206, 502, the present systems and methods disclosed herein facilitate the generation or creation of new online user accounts and/or new online account users and/or the rewarding of the newly generated online user accounts and/or account users and/or existing online user accounts and/or account users with the at least one gift, reward, promotional discount, promotional awards, payment, or combination thereof.

The following examples are merely illustrative of the novel and inventive systems and methods disclosed herein. The examples are not meant to be restrictive of the systems and methods disclosed herein and do not limit the present disclosure with respect to numbers of new and/or existing users or customers utilizing the present systems and methods and/or numbers of novel and inventive pads utilized by the new and/or existing users while practicing the present systems and methods disclosed herein.

In one or more embodiments, the systems and method disclosed herein may comprise at least one of printing, displaying, and disposing at least one of the first machine-readable code 24 and the second machine-readable code 26 on the first side 12 of the first pad 10A and the first partial code 28 on either the first side 12 or the second side 14 of the first pad 10A. Additionally, the systems and methods may comprise at least one of printing, displaying, and disposing at least one of the first machine-readable code 24 and the second machine-readable code 26 on the first side 12 of the second pad 10b and the second partial code 30 on either the first side 12 or the second side 14 of the second pad 10B. The systems and methods may further comprise at least one distributing and providing the pads 10A, 10B to at least one vendor and/or distributor for vending or distributing to users of the pads 10A, 10B. Further, the systems and methods may comprise at least one of distributing, selling, and giving away the pads 10A, 10B from the at least one vendor and/or distributor. Still further, a first user of the at least two users may scan the first machine-readable code 24 or the second machine-readable code 26 of the first pad 10A with a portable digital device of the first user. As a result, the portable digital device of the first user may be directed and/or driven to at least one online new or existing account website/webpage of an online provider which may request the first user to create a new online account with the online provider or access an existing or previously created online account with the online provider based on scanned first machine-readable code 24 or second machine-readable code 26 of the first pad 10A. After the new online account is created by the first user or the existing or previously created online account has been accessed by the first user, the first user may assemble, combine, and/or align the first partial code 28 on the first pad 10A with the second partial code 30 on the second pad 10B to assemble, display, form, produce, provide, and/or dispose the first assembled code 32 or the second assembled code 38. In some embodiments, the first assembled code 32 or the second assembled code 38 is assembled, formed, produced, and/or provided by abutting the first and second partial codes 28, 30 against each other at the assembly edges 18 of the pads 10A, 10B as shown in FIGS. 10, 12, 13, 16, 19, and 24. After the first assembled code 32 or the second assembled code 38 has been assembled, formed, and/or produced, the first user may scan the first assembled code 32 or the second assembled code 38 with the portable digital device of the first user. As a result, the portable digital device of the first user may be directed or driven to at least one online reward website/webpage of the online provider, and the at least one online reward website/webpage rewards, awards, or gifts the first user with at least one first reward selected from one or more bonuses, one or more dining experiences, one or more promotional codes, one or more promotional awards or bonuses, one or more redeemable credits, one or more gifts, one or more getaways, one or more entertainment experiences, one or more rewards, one or more discounts, and/or one or more payments. In embodiments, the at least one first reward has a first monetary value and/or a first transactional value associated with the online account with the online provider.

A second user of the at least two users may scan the first machine-readable code 24 or the second machine-readable code 26 of the second pad 10B with a portable digital device of the second user. As a result, the portable digital device of the second user may be directed or driven to at least one online new or existing account website/webpage of the online provider which may request the second user to create a new online account with the online provider or access an existing or previously created online account with the online provider based on scanned first machine-readable code 24 or second machine-readable code 26 of the second pad 10B. After the new online account is created by the second user or the existing or previously created online account has been accessed by the second user, the second user may assemble, combine, and/or align the first partial code 28 on the first pad 10A with the first partial code 28 on the second pad 10B to assemble, display, form, produce, provide, and/or dispose the first assembled code 32 or the second assembled code 38. In some embodiments, the first assembled code 32 or the second assembled code 38 is assembled, formed, produced, and/or provided by abutting the first partial codes 28 of the pads 10A, 10B against each other at the assembly edges 18 of the pads 10A, 10B. After the second assembled code 38 has been assembled, formed, and/or produced, the second user may scan the first assembled code 32 or the second assembled code 38 with the portable digital device of the second user. As a result, the portable digital device of the second user may be directed or driven to at least one online reward website/webpage of the online provider, and the at least one online reward website/webpage rewards, awards, or gifts the second user with at least one second reward selected from one or more bonuses, one or more dining experiences, one or more promotional codes, one or more promotional awards or bonuses, one or more redeemable credits, one or more gifts, one or more getaways, one or more entertainment experiences, one or more rewards, one or more discounts, and/or one or more payments. In embodiments, the at least one second reward has a second monetary value and/or a second transactional value associated with the online account of the online provider. In at least one embodiment, the first monetary value and/or the first transactional value may be greater than, less than, or about equal to the second monetary value and/or the second transactional value.

In one or more embodiments, the at least one first reward received by the first user may be the same as, substantially the same as, or different than the second reward received by the second user. In some embodiments, the first monetary value and/or the first transactional value may be greater than or less than the second monetary value and/or the second transaction value. The difference between the first reward and the second reward may be based upon whether the first user and the second user created a new online account or accessed a previously created online account. For example, second user may have already created an existing online account with the online provider and the first user may not have an existing online account with the online provider. However, the second user may understand from the printed indicia 20, 22 displayable on the pads 10A, 10B that he/she may be eligible to receive the at least one second reward from the online provider if the first user creates a new online account with the online provider. Additionally, the printed indicia 20, 22 displayable on the pads 10A, 10B may indicate the first machine-readable code 24 may facilitate creating the new online account for the first user and the second machine-readable code 26 may facilitate accessing the existing online account for the second user.

In some embodiments, the systems and methods disclosed herein may comprise at least one of scanning first machine-readable code 24 with at least one portable digital and/or handheld mobile device of a new user, pushing internet browser of digital or mobile device of the new user to online new account creation website or webpage of online provider based on scanned first machine-readable code 24, creating new online user account for the new user with online provider via online new account creation website or webpage, and/or assembling the first assembled code 32 by folding over the pad 10A onto itself as shown in FIG. 3 or 4 or abutting to the pads 10A, 10B to form the first assembled code 32 as shown in FIG. 10, 12, 13, 16, 17, 19, 20, 22, or 24. Further, the present systems and methods may comprise at least one of scanning the first assembled code 32 with the digital and/or mobile device of the new user, pushing internet browser of digital device to online rewards website or webpage of online provider based on the first assembled code 32, and/or awarding, rewards, or gifting the new user with a gift, reward, discount, promotional award or bonuses, and/or payment having a first value based on the scanned first assembled code 32.

In some embodiments, the systems and methods disclosed herein may comprise one or more of scanning the first machine-readable code 24 with first portable and/or mobile device of first new user, pushing an internet browser of first device to online new account creation website or webpage of online provider based on scanned first machine-readable code 24, creating a new online user account for the first new user with online provider via online new account creation website or webpage, forming and/or displaying the first assembled code 32 by abutting and aligning the pads 10A, 10B to produce the first assembled code 32. The present systems and methods may comprise at least one of scanning the first assembled code 32 with first device of first new user and pushing the internet browser of first device of the first new user to online rewards website or webpage of online provider based on the scanned first assembled label 32 and awarding the first new user with a gift, reward, discount, promotional award or bonuses, and/or payment having a first value based on the scanned first assembled code 32. Further, the present systems and methods may comprises at least one of the second machine-readable code 26 with second portable and/or mobile device of second new user, pushing an internet browser of second device to online new account creation website or webpage of online provider based on scanned second machine-readable code 26, creating a new online user account for the second new user with online provider via online new account creation website or webpage, assembling the second assembled code 38 by folding over the pad 10A onto itself or abutting to the pads 10A, 10B together to form the second assembled code 38, scanning the second assembled code 38 with portal or mobile device of second new user, pushing the internet browser of digital device to online rewards website or webpage of online provider based on the scanned second assembled code 38, and/or awarding, rewarding, or gifting the second new user with a gift, reward, discount, promotional award or bonuses, and/or payment having a second value based on the scanned second assembled code 38. In some embodiments, the first value received by the first new user is greater than, less than, or about equal to the second value received by the second new user.

In one or more embodiments, the novel and inventive systems and methods disclosed herein may comprise a first new user scanning, with a first user mobile device, the first machine-readable code 24 of the pad 10A which is indicative of creating a new online user account with an online gaming provider. The first user mobile device may display the online new account website and the first new user may create a new online user account with the online gaming provider. The first new user may align pads 10A, 10B to form the first assembled code 32 which is scanned with the first user mobile device and the first new user receives a first promotional online bonus from the online gaming provider having a first value. The second user may scan, with a second user mobile device, the second machine-readable code 26 of the pad 10B which is indicative of accessing an existing online user account with the online gaming provider. The second assembled code 38 may be displayed by aligning the pads 10A, 10B together and the second assembled code 38 may be scanned with the second user mobile device. As a result, the second user may receive a second promotional online bonus from the online gaming provider having a second value, wherein the second value may be greater than or less than the first value. In an embodiment, a second new user or a third user may scan either the first machine-readable code 24 or the second machine-readable code 26, respectively of any pad of the pads 10A, 10B, 10C. The second assembled code 38 or the third assembled code 206 may be displayed by at least two pads of the pads 10A, 10B, 10C and may be scanned by an additional mobile device of the second new user or the third user. As a result, the second new user or the third user may receive a third promotional online bonus from the online gaming provider having a third value, which may be greater than, less than, or about equal to the first value or the second value. For example, the first value may be a $100 credit with the online gaming provider, the second value may be a $50 or $150 credit with the online gaming provider, and the third value may be a $25, $50, $75, $100, $150, or $200 credit with the online gaming provider.

In some embodiments, the present systems and methods disclosed herein may comprise a first new user scanning, with a first user mobile device, the first machine-readable code 24 of the pad 10A which is indicative of creating a new online user account with a tabletop or digital collective card game provider. The first user mobile device may display the online new account website and the first new user may create a new online user account with the tabletop or digital collective card game provider. The first new user may align pads 10A, 10B to form the first assembled code 32 which is scanned with the first user mobile device and the first new user receives a first promotional online collective card having a first online in-game value. The second user may scan, with a second user mobile device, the second machine-readable code 26 of the pad 10B which is indicative of accessing an existing online user account with the tabletop or digital collective card game provider. The second assembled code 38 may be displayed by aligning the pads 10A, 10B together and the second assembled code 38 may be scanned with the second user mobile device. As a result, the second user may receive a second promotional online collective card having a second online in-game value, wherein the second online in-game value may be greater than or less than the first online in-game value. In an embodiment, a second new user or a third user may scan either the first machine-readable code 24 or the second machine-readable code 26, respectively of any pad of the pads 10A, 10B, 10C. The second assembled code 38 or the third assembled code 206 may be displayed by at least two pads of the pads 10A, 10B, 10C and may be scanned by an additional mobile device of the second new user or the third user. As a result, the second new user or the third user may receive a third promotional online collective card from the online gaming provider having a third online in-game value, which may be greater than, less than, or about equal to the first value or the second value. For example, the first promotional online collective card may be a common or rare online collective card, the second promotional online collective card may be a common, rare, or very rare online collective card, and the third promotional online collective card may be a common, rare, or very rare online collective card.

In one or more embodiments, the present systems and methods disclosed herein may comprise a first new user scanning, with a first user mobile device, the first machine-readable code 24 of the pad 10A which is indicative of creating a new online user account with an online company or association. The first user mobile device may display the online new account website and the first new user may create a new online user account with the online company or association. The first new user may align at least two pads of pads 10A-10D to form the third assembled code 206 which is scanned with the first user mobile device and the first new user receives a first promotional discount having a first monetary value. The second user may scan, with a second user mobile device, the second machine-readable code 26 of the pad 10D which is indicative of accessing an existing online user account with the online company or online association. The first assembled code 32 may be displayed by aligning the at least two pads of the pads 10A-10D together and the first assembled code 32 may be scanned with the second user mobile device. As a result, the second user may receive a second promotional discount having a second monetary value, wherein the first promotional discount is a 10% discount with respect to annual fees payable to the online company or association and the second promotional discount is a 25% discount with respect to annual fees payable to the online company or association. In an embodiment, a second new user or a third user may scan either the first machine-readable code 24 or the second machine-readable code 26, respectively of any pad of the pads 10A-10D. The assembled code 502 may be displayed by at least two pads or all pads of the pads 10A-10D and may be scanned by an additional mobile device of the second new user or the third user. As a result, the second new user or the third user may receive a third promotional discount which may be a 5% discount, 10% discount, 25% discount or 50% discount with respect to annual fees payable to the online company or association and/or a discount with respect to registration to one or more in-person events or conferences provided or sponsored by or affiliated with the online company or associate.

Examples in the present disclosure may also be directed to a non-transitory computer-readable medium storing computer-executable instructions and executable by one or more processors of the computer via which the computer-readable medium is accessed. A computer-readable media may be any available media that may be accessed by a computer. By way of example, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Note also that the software implemented aspects of the subject matter claimed below are usually encoded on some form of program storage medium or implemented over some type of transmission medium. The program storage medium is a non-transitory medium and may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The claimed subject matter is not limited by these aspects of any given implementation.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A system configured to generate new online user accounts, the system comprising:
   a plurality of partial machine-readable codes alignable and combinable to display or provide assembled machine-readable codes,
   wherein,
      partial machine-readable codes of the plurality of partial machine-readable codes are separate and independent with respect to each other,
      each partial machine-readable code of the plurality of partial machine-readable codes is a portion of at least one assembled machine-readable code that is alignable and combinable with at least one other portion of the at least one assembled machine-readable code to display or provide the at least one assembled machine-readable code, the partial machine-readable codes comprise a first partial machine-readable code, at least one second partial machine-readable code, and at least one third partial machine-readable code, the plurality of partial machine-readable codes, in a first assembled configuration, align and combine the first partial machine-readable code and the at least one second partial machine-readable code to display or provide a first assembled machine-readable code, the plurality of partial machine-readable codes, in a second assembled configuration, align and combine the first partial machine-readable code and the at least one third partial machine-readable code to display or provide a second assembled machine-readable code that is different than the first assembled machine-readable code, each partial machine-readable code of the plurality of partial machine readable codes is selected from a partial machine-readable matrix or a partial two-dimensional barcode, the first assembled machine-readable code is selected from a first machine-readable matrix or a first two-dimensional barcode and indicative of a first online account reward website or webpage for receiving a first reward, and the second assembled machine-readable code is selected from a second machine-readable matrix or a second two-dimensional barcode and indicative of a second online account reward website or webpage for receiving a second reward that is different from the first reward.

2. The system of claim 1, wherein each of the first assembled machine-readable code and the second assembled machine-readable code is a machine-readable quick response code.

3. The system of claim 1, further comprising:
at least one machine-readable code displayable on a planar surface and selected from:
a third machine-readable matrix or a third two-dimensional barcode is indicative of at least one new online user account website or webpage provided by an online provider; or
a fourth machine-readable matrix or a fourth two-dimensional barcode indicative of at least one existing online user account website or webpage provided by the online provider.

4. The system of claim 2, wherein at least one of:
the plurality of partial machine-readable codes is displayable on one or more planar surfaces; and
at least one of the first assembled machine-readable code and the second assembled machine-readable code is displayable on the one or more planar surfaces.

5. The system of claim 2, wherein at least one of:
edges of the first partial machine-readable code and the at least one second partial machine-readable code are alignable, in the first assembled configuration, to display the first assembled machine-readable code; and
edges of the first partial machine-readable code and the at least one third partial machine-readable code are alignable, in the second assembled configuration, to display the second assembled machine-readable code.

6. The system of claim 5, wherein the edges of the first partial machine-readable code and the at least one second partial machine-readable code or the edges of the first partial machine-readable code and the at least one third partial machine-readable code are outer edges of at least two planar surfaces or edges extending along perimeters of the at least two planar surfaces.

7. The system of claim 1, further comprising:
a first planar surface comprising the first partial machine-readable code; and
at least one second planar surface comprising at least one of the at least one second partial machine-readable code and the at least one third partial machine-readable code,
wherein the at least one of the first assembled machine-readable code or the second assembled machine-readable code is displayable and machine-readable when an assembly edge of the first planar surface is adjacent to an assembly edge of the at least one second planar surface.

8. The system of claim 7, further comprising:
at least one third planar surface comprising outer edges adjacent to a plurality of partial machine-readable quick response codes that are combinable with the first partial machine-readable code, the at least one second partial machine-readable code, or the at least one third partial machine-readable code to display a plurality of machine-readable quick response codes indicative of at least one third online account reward website or webpage for receiving at least one third reward.

9. The system of claim 8, wherein the plurality of machine-readable quick response codes is displayable and machine-readable when the outer edges of the at least one third planar surface are adjacent to assembly edges of at least one of the first planar surface and the at least one second planar surface.

10. The system of claim 1, further comprising:
at least one online account reward of the first reward accessible via the at least one first online account reward website or webpage, wherein the at least one online account reward has a monetary value and/or a transactional value with respect to an online user account associated with the online provider.

11. The system of claim 1, further comprising:
at least one first online account reward of the first reward accessible via the at least one first online account reward website or webpage, wherein the at least one first online account reward has a first monetary value and/or a first transactional value with respect to a first online user account associated with the online provider; and
at least one second online account reward of the second reward accessible via the at least one second online account reward website or webpage, wherein the at least one second online account reward has a second monetary value and/or a second transactional value with respect to a second online user account associated with the online provider,
wherein the first monetary value and/or the first transactional value is different than the second monetary value and/or the second transactional value.

12. A method of generating new online user accounts and rewarding online account users facilitated by the system of claim 3, the method comprising:
image scanning or machine-reading the third machine-readable matrix or the third two-dimensional barcode;
creating a new online user account associated with the online provider via the at least one new online user account website or webpage;
aligning and combining the first partial machine-readable code and the at least one second partial machine-readable code to display the first assembled machine-readable code when the plurality of partial machine-readable codes is disposed or provided in the first assembled configuration;

image scanning or machine-reading the first assembled machine-readable code; and accessing and/or opening the first online account reward website or webpage to receive the first reward associated with the first assembled machine-readable code.

13. The method of claim 12, further comprising:

receiving or accessing at least one first online account reward via the accessed and/or opened first online account reward website or webpage, wherein the at least one first online account reward has a first monetary value and/or a first transactional value with respect to a first online user account associated with the online provider.

14. The method of claim 13, further comprising:

image scanning or machine-reading the second machine-readable code;

accessing an existing online user account associated with the online provider via the at least one existing online user account website or webpage;

aligning and combining the first partial machine-readable code and at least one third partial machine-readable code to display the second assembled machine-readable code;

image scanning or machine-reading the second assembled machine-readable code; and accessing and/or opening the second online account reward website or webpage to receive the second reward associated with the second assembled machine-readable code.

15. The method of claim 14, further comprising:

receiving, accessing, or assigning the at least one second online account reward via the accessed and/or opened second online account reward website or webpage, wherein the at least one second online account reward has a second monetary value and/or a second transactional value with respect to a second online user account associated with the online provider.

16. The method of claim 15, wherein the first monetary value and/or the first transactional value of the at least one first online reward is less than, greater than, or equal to the second monetary value and/or the second transactional value of the at least one second online reward.

17. A system configured to generate new online user accounts, the system comprising:

a plurality of partial machine-readable quick response codes, wherein the partial machine-readable quick response codes of the plurality of partial machine-readable quick response codes are separate and independent with respect to each other, each partial machine-readable quick response code of the plurality of partial machine-readable quick response codes is a portion of at least one assembled machine-readable quick response code that is alignable and combinable with at least one other portion of the at least one assembled machine-readable code to display or provide the at least one assembled machine-readable quick response code, the partial machine-readable quick response codes comprise a first partial machine-readable quick response code displayed on a first surface or a first portion of a first surface, at least one second partial machine-readable quick response code displayed on a second surface, a first portion of the second surface, or a second portion of the first surface, and at least one third partial machine-readable quick response code displayed on a third surface, a second portion of the second surface, or a third portion of the first surface, pairs of the partial machine-readable quick response codes are alignable and combinable in at least two paired or assembled configurations to display or provide at least two assembled machine-readable quick response codes, a first assembled machine-readable quick response code of the at least two assembled machine-readable quick response codes is indicative of a first online account reward website or webpage for receiving a first reward, and at least one second assembled machine-readable quick response code of the at least two assembled machine-readable quick response codes is indicative of at least one second online account reward website or webpage for receiving at least one second reward that is different from the first reward.

18. The system of claim 17, wherein at least one of the first surface, the second surface, and the third surface is at least one planar display surface.

19. The system of claim 17, wherein the first assembled machine-readable quick response code is displayed or formed by aligning an assembly edge of the first partial machine-readable quick response code and an assembly edge of the second partial machine-readable quick response code.

20. The system of claim 19, wherein the second assembled machine-readable quick response code is displayed or formed by aligning an assembly edge of the first partial machine-readable quick response code and an assembly edge of the third partial machine-readable quick response code.

* * * * *